US012800126B2

(12) United States Patent

Ruan et al.

(10) Patent No.: US 12,800,126 B2
(45) Date of Patent: *Nov. 17, 2026

(54) DEICING SYSTEM FOR AN AUTOMOTIVE LAMP

(71) Applicant: Grote Industries, Inc., Madison, IN (US)

(72) Inventors: Jiabiao Ruan, Madison, IN (US); Cesar Perez-Bolivar, Madison, IN (US); Ammar Ali, Madison, IN (US); Shengjie Tang, Madison, IN (US); Sankalp Pampattiwar, Madison, IN (US); Saurabh Kale, Milton, KY (US)

(73) Assignee: Grote Industries, Inc., Madison, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/933,119

(22) Filed: Oct. 31, 2024

(65) Prior Publication Data

US 2025/0230916 A1 Jul. 17, 2025

Related U.S. Application Data

(63) Continuation of application No. 18/010,502, filed as application No. PCT/US2021/035909 on Jun. 4, (Continued)

(51) Int. Cl.
*F21S 45/60* (2018.01)
*F21S 41/20* (2018.01)
(Continued)

(52) U.S. Cl.
CPC ............. *F21S 45/60* (2018.01); *F21S 41/285* (2018.01); *F21V 31/005* (2013.01); *H05B 3/16* (2013.01);
(Continued)

(58) Field of Classification Search
CPC ........................................................ F21S 45/60
See application file for complete search history.

(56) References Cited

U.S. PATENT DOCUMENTS 3,772,075 A * 11/1973 Tamopol ............. C03C 17/3649 427/404
3,874,330 A * 4/1975 Zoccolini ................ C03C 17/06 118/221
(Continued)

FOREIGN PATENT DOCUMENTS

CA 3120333 A1 6/2020
EP 0788295 B1 9/2003
(Continued)

OTHER PUBLICATIONS

English machine translation of JP 2007-305338 A dated Nov. 22, 2007, obtained from www.patdocs.com.
(Continued)

*Primary Examiner* — Cachet I Proctor
(74) *Attorney, Agent, or Firm* — Woodard Emhardt Henry Reeves & Wagner LLP

(57) ABSTRACT

A lamp or lens assembly for a motor vehicle that includes electrically conductive traces for defogging or deicing the lens, and a method of applying the conductive traces to the lens. Aspects include a light transmissive lens coupled to a lamp housing. The light transmissive lens may define a curved cross-section with a curvature extending across the length and/or the width of the lens. The lens may include one or more electrically conductive traces positioned on a surface of the lens, the electrically conductive traces optionally extending across and curving with the curvature of the light transmissive lens. The method of applying includes depositing the conductive traces on the surface of the lens using a applicator that may include precisely control spray mechanism. The applicator may be automatically oriented during
(Continued)

the application process to maintain a predetermined distance and/or orientation with respect to the surface of the lens.

22 Claims, 14 Drawing Sheets

Related U.S. Application Data

2021, now Pat. No. 12,158,255, which is a continuation of application No. 16/901,203, filed on Jun. 15, 2020, now Pat. No. 11,255,508.

(60) Provisional application No. 63/114,576, filed on Nov. 17, 2020.

(51) Int. Cl.
*F21V 31/00* (2006.01)
*H05B 3/16* (2006.01)
*H05B 3/84* (2006.01)

(52) U.S. Cl.
CPC ......... *H05B 3/84* (2013.01); *H05B 2203/013* (2013.01); *H05B 2203/016* (2013.01); *H05B 2214/02* (2013.01)

(56) References Cited

U.S. PATENT DOCUMENTS

| | | | | |
|---|---|---|---|---|
| 6,563,086 | B1 | 5/2003 | Meirndorf et al. | |
| 8,217,306 | B2 | 7/2012 | Inoue et al. | |
| 8,256,944 | B2 | 9/2012 | Yasuda | |
| 8,389,910 | B2 | 3/2013 | Bourke, III et al. | |
| 8,410,402 | B2 | 4/2013 | Burton | |
| 8,459,848 | B2 * | 6/2013 | Marley | F21S 45/60 362/520 |
| 8,596,845 | B2 | 12/2013 | Burton et al. | |
| 8,618,443 | B2 | 12/2013 | Inoue et al. | |
| 8,899,803 | B2 | 12/2014 | Marley | |
| 8,967,842 | B2 | 3/2015 | Shah et al. | |
| 9,057,512 | B2 | 6/2015 | En et al. | |
| 9,333,904 | B2 | 5/2016 | Dross | |
| 9,518,714 | B2 | 12/2016 | Ah | |
| 9,578,718 | B2 | 2/2017 | Yokoyama et al. | |
| 9,994,195 | B2 | 6/2018 | Lesmeister et al. | |
| 10,364,954 | B2 | 7/2019 | Deering | |
| 2003/0029336 | A1 | 2/2003 | Thompson et al. | |
| 2006/0011596 | A1 | 1/2006 | Sharp et al. | |
| 2006/0278803 | A1 | 12/2006 | Mochizuki | |
| 2007/0151966 | A1 | 7/2007 | Schwenke et al. | |
| 2007/0181565 | A1 * | 8/2007 | Murahashi | H05B 3/86 219/629 |
| 2010/0006554 | A1 * | 1/2010 | Inoue | F21S 41/148 219/202 |
| 2011/0262627 | A1 | 10/2011 | Schwenke et al. | |
| 2012/0075385 | A1 * | 3/2012 | Kozee | B41J 2/17596 347/47 |
| 2013/0249375 | A1 | 9/2013 | Panagotacos et al. | |
| 2014/0332518 | A1 | 11/2014 | Lesmeister et al. | |
| 2015/0023037 | A1 | 1/2015 | Bauer et al. | |
| 2015/0078022 | A1 | 3/2015 | Bauer | |
| 2015/0252997 | A1 | 9/2015 | Hamid et al. | |
| 2015/0321621 | A1 | 11/2015 | Van Dan Elzen et al. | |
| 2015/0369445 | A1 | 12/2015 | Orr et al. | |
| 2016/0341390 | A1 | 11/2016 | Yamamura et al. | |
| 2016/0348869 | A1 | 12/2016 | Williams et al. | |
| 2016/0348870 | A1 | 12/2016 | Kim et al. | |
| 2016/0363286 | A1 | 12/2016 | Deering | |
| 2017/0234503 | A1 | 8/2017 | Buffone et al. | |
| 2019/0271450 | A1 | 9/2019 | Dallos et al. | |
| 2020/0205238 | A1 * | 6/2020 | Brooks | B32B 27/365 |
| 2020/0300440 | A1 | 9/2020 | Monpremier | |

FOREIGN PATENT DOCUMENTS

| | | | |
|---|---|---|---|
| EP | 2 264 360 | A1 | 12/2010 |
| JP | 2007-305338 | A | 11/2007 |
| WO | WO 2017086381 | A1 | 5/2017 |

OTHER PUBLICATIONS

English translation of CA 3120333 A1 provided.
English translation of WO 2017/086381 A1 provided.
Jansson, De-icing and ice prevention of automotive headlamps and tail lamps, Stockholm 2014, Master of Science Thesis, KTH Industrial Eng. and Management.

* cited by examiner

2200

2700

DEICING SYSTEM FOR AN AUTOMOTIVE LAMP

BACKGROUND

The present disclosure relates to lenses for lamp assemblies, for example, for automotive lamps such as head lamps, or perhaps tail lamps, turn signals, brake lamps, cargo lamps, and the like. These lamps may use incandescent or High Intensity Discharge (HID) lamps which generally create enough heat to reduce or eliminate fluid that may form on the lens such as in the case of condensation, rain, sleet, snow, ice, fog, and the like. Such a buildup of fluid may result in suboptimal light transmission and may degrade the performance of the lamp to a degree that renders it temporarily unusable, particularly in poor weather. This is especially concerning in the case of some types of Light Emitting Diode (LED) lamps where the lamp may not produce sufficient residual heat to effectively remove the fluid that may build up on the lens either in liquid or solid form, and especially in colder weather.

SUMMARY

Disclosed are examples of a lamp or lens assembly for a vehicle that include aspects for deicing the lens, and aspects of a method for applying the disclosed deicing system to a lamp or lens. In one example, the assembly may include a lamp positioned in a housing with a light transmissive lens coupled to the housing in front of the lamp. In another aspect, the light transmissive lens may define a curved cross-section with a curvature extending across the lens. In another aspect, lamp assembly may include one or more electrically conductive traces positioned on a surface of the lens, the electrically conductive traces optionally extending across and curving with the curvature of the light transmissive lens. In another aspect, the assembly may include a first coating covering the one or more electrically conductive traces, the first coating optionally covering a portion of the lens surface leaving a separate second portion uncovered. In another aspect, the electrically conductive traces optionally extend outwardly away from the surface of the lens and may have a thickness of at least 0.001 mm, at least 0.01 mm, at least 0.1 mm, or at least 1 mm, or more.

In another aspect, the electrically conductive traces are optionally positioned on an inside surface of the lens. In another aspect, the electrically conductive traces may have a cross-section that is taller than it is wide. In another aspect, the curvature of the light transmissive lens optionally defines a concave interior surface, and optionally a convex exterior surface. In another aspect, the electrically conductive traces may be positioned on the concave interior surface of the lens, on the convex exterior surface of the lens, or both.

In another aspect, the electrically conductive traces are optionally primarily made of conductive silver ink. In another aspect, the silver ink may be transparent, light transmissive, reflective, or opaque. In another aspect, the conductive ink may comprise silver, copper, gold, carbon and/or other metals, or other macro or nano particles, or any suitable combination thereof. In another aspect, filler materials may be included in the ink to optionally provide the required characteristics to the ink including flexibility, optimum cure temperature profile, and others.

In another aspect, the assembly may include a second coating covering the first coating and the one or more electrically conductive traces, wherein the second coating may have a different chemical composition than the first coating, and wherein either the first or second coating (or both coatings) may include an anti-fog compound. In another aspect, the light transmissive lens optionally defines a curved surface area that is at least 65 square inches.

In another aspect, the light transmissive lens may be substantially round, and may define a curved cross-section that includes an arc extending outwardly from a center portion of the lens. In another aspect, the light transmissive lens may be about 4 to 4½ inches in diameter. In another aspect, the lens may be a headlight lens for a vehicle, that optionally defines an L-shaped cross-section and a corresponding corner region. The electrically conductive traces may extend across the corner region.

In another aspect, the assembly may include at least two electrically conductive terminals on the surface of the light transmissive lens. The at least two electrically conductive terminals are optionally electrically connected to the conductive traces. One of the electrically conductive terminals may be configured to receive power from a vehicle power source. In another aspect, another of the conductive terminals may be configured to receive an electrical connection to a ground circuit. In another aspect, the electrically conductive traces may have a resistance of less than 500 ohms.

In another example of the disclosed concepts, a lens assembly for a vehicle lamp is disclosed that may include a light transmissive lens that optionally defines a curved cross-section with a curvature that may extend across a length or a width of the lens. In another aspect, one or more electrically conductive traces may be positioned on an inside surface of the lens, the electrically conductive traces optionally extending across the curvature of the light transmissive lens. In another aspect, the curved cross-section optionally defines a concave inside surface of the lens.

In another aspect, the disclosed electrically conductive traces may have a thickness of at least 0.001 mm, at least 0.01 mm, at least 0.1 mm, or at least 1 mm, or more. In another aspect, the electrically conductive traces may be primarily made of any suitable conductor, and/or may all for any suitable level of light transmission. In one example, the conductive traces include conductive compounds comprising, or made primarily of: silver, aluminum, copper, carbon, gold, or any combination thereof. In another example, the conductive traces may be fully light transmissive, substantially transparent, partially transparent, substantially opaque, or fully opaque. In another aspect, the traces may be vary in the light transmissive aspect, and/or in the conductive. One portion of the traces may optionally be more light transmissive than another portion, or less so, and/or one portion of the traces may be more resistive, or more conductive than another portion. In another aspect, the more resistive portion may be more or less light transmissive, and/or the less resistive portion may be more or less light resistive. In another aspect, the resistive aspect and the light transmissive aspect may be mutually exclusive and one aspect may vary irrespective of variations in the other aspect.

In another aspect, the lens assembly may include a first coating optionally covering at least a portion of the one or more electrically conductive traces and optionally covering a portion of the lens adjacent traces. In another aspect, a separate second portion of the lens may be free of the first coating.

In another aspect, the electrically conductive traces may have a cross-section that is taller than it is wide. In another aspect, the electrically conductive traces may extend outwardly away from the surface of the lens and have a thickness of at least 0.001 mm, at least 0.01 mm, at least 0.1 mm, or at least 1 mm, or more. In another aspect, the electrically conductive traces may be primarily made of conductive silver ink with a resistance of at least 0.5 ohms, at least about 150 ohms, at least about 500 ohms, or at least 5000 ohms, or more. The disclosed ink may optionally be any one of be opaque, transparent, reflective, or translucent, and may comprise any suitable conductive material or metal.

In another aspect, a second coating may cover some or all of the first coating and at least some portion of the one or more electrically conductive traces. In another aspect, the second coating may have a different chemical composition than the first coating. In another aspect, the second coating may include an anti-fog compound.

In another aspect, the light transmissive lens optionally defines a curved surface area that is at least 25 square inches, at least 65 square inches, at least 125 square inches, or at least 500 square inches or more. In another aspect, light transmissive lens may be substantially round and at least 2 inches in diameter, at least 4 to 4½ inches in diameter, at least 6 to 6½ inches in diameter, or at least 10 inches in diameter or more. In another aspect, the assembly includes a housing coupled to the lens, and a lamp positioned in the housing adjacent the concave inside surface of the lens. In another aspect, the assembly may include a sealing member between the housing and the lens configured to partially or hermetically seal the housing to the lens with the lamp inside the housing.

Methods of applying the disclosed conductive traces are also disclosed. In one example, the disclosed method may include applying conductive traces to a lens using an applicator assembly optionally controlled by a control circuit. The applicator assembly optionally applies the conductive traces without contacting the lens, and optionally programming or configuring the control circuit to control the applicator assembly according to one or more operating parameters and/or by a pattern defining locations for the conductive traces on the lens. In another aspect, the method my include applying the conductive ink to the surface of the lens using the applicator assembly controlled by the control circuit. The control circuit may automatically adjust operational aspects of the applicator assembly according to the operating parameters and the pattern. In another aspect, the method may include curing the conductive ink applied to the lens after applying the conductive ink.

In another aspect, the method optionally includes automatically adjusting the operation of the applicator assembly based on a Linear Mass Density (LMD) of the conductive ink applied by the applicator assembly. In another aspect, the method optionally includes using the control circuit to control the applicator assembly to adjust the LMD of the conductive ink applied to the lens according to a frequency at which individual separate portions of ink (i.e. "shots" or "dots" of ink) are applied by the applicator assembly. In another aspect, the method optionally includes using the control circuit to control the applicator assembly to adjust the LMD of the conductive ink applied to the lens according to the size of individual separate portions of ink applied by the applicator assembly. In another aspect, the method optionally includes using the control circuit to control the applicator assembly to adjust the LMD of the conductive ink applied to the lens according to a material conductivity of the conductive ink.

In another aspect, the method optionally includes applying an anti-fog coating over the conductive traces before curing the conductive ink. In another aspect, the method optionally includes applying a hardening coating to an outside surface of lens. In another aspect, the method optionally includes automatically adjusting the operation of the applicator assembly based on a material rheology and/or a material conductivity of the conductive ink.

In another aspect, the method optionally includes automatically adjusting the operation of the applicator assembly based on a frequency at which the individual shots of ink are applied over time, or a size of the individual shots of ink, or any combination thereof.

In another aspect, the method optionally includes automatically adjusting the operation of the applicator assembly based on a conductive filler ratio defined by a ratio of a binder to a conductive filler of the conductive ink, a solvent ratio defined by a ratio of the binder to a solvent of the conductive ink, or a material ratio defined by a ratio of the solvent to a conductive filler of the conductive ink, or any combination thereof. For example, the solvent ratio of the conductive ink may be between 3 pph and 5 pph. In another aspect, the operating parameters may include a temperature, age, curing temperature, curing time, vapor pressure, particle size distribution, particle orientation, an adhesion property of the conductive ink with respect to the lens surface, material elongation properties, surface energy of the lens surface, or conductive filler loading of the conductive ink applied by the applicator assembly, or any combination thereof.

In another aspect, the method optionally includes controlling the applicator assembly to automatically adjust a force applied to the conductive ink by a plunger of the applicator assembly.

In another aspect, the method optionally includes controlling the applicator assembly to automatically adjust a plunger velocity of the plunger.

In another aspect, the method optionally includes controlling the applicator assembly to apply the conductive ink according to the length of the plunger.

In another aspect, the method optionally includes controlling the applicator assembly to apply the conductive ink according to the diameter of the plunger.

In another aspect, the method optionally includes controlling the applicator assembly to apply the conductive ink according to a frequency of movement of the plunger.

In another aspect, the method optionally includes controlling the applicator assembly to apply the conductive ink according to a maximum travel speed of the plunger.

In another aspect, the method optionally includes controlling the applicator assembly to apply the conductive ink according to a configuration of an orifice of the applicator assembly from which the conductive ink may be applied.

In another aspect, the method optionally includes controlling the applicator assembly to apply ink according to the spacing of the conductive ink defined in the pattern.

In another aspect, the viscosity of the conductive ink may be between 17,000 and 25,000 centipoise @ 0.1 secs, wherein the viscosity of the conductive ink may be between 4,500 centipoise and 7,500 centipoise @ 0.01 secs, wherein the sheet resistivity of ink may be between 0.01 and 0.02 ohm/square/mil, wherein the silver loading of the conductive ink may be between 55% and 95%, or any combination thereof. In another aspect, the conductive ink comprises silver, copper, gold, carbon and/or other metals, or other macro or nano particles, or any suitable combination thereof.

In another aspect, the method optionally includes automatically adjusting a temperature of the conductive ink to between 25 and 45 degrees C. using a temperature control of the applicator assembly.

In another aspect, the method optionally includes adjusting a flow rate of the conductive ink applied by the applicator assembly in order to control the resulting resistance of the traces.

In another aspect, the method optionally includes controlling the applicator assembly to automatically compensate for shifts in material sheet resistivity of the traces.

In another aspect, the method optionally includes using a sensor to monitor a flow rate of ink applied by the nozzle during dispensing.

In another aspect, the method optionally includes adjusting the operating parameters of the applicator assembly as the conductive ink may be being applied, wherein the control circuit uses the flow rate of the conductive ink to adjust the operating parameters to obtain a predetermined sheet resistivity for the conductive ink applied to the lens.

In another aspect, the method optionally includes activating a deionizing blower for between 10 and 60 secs to reduce static electricity on a surface of the lens where the conductive ink may be applied.

In another aspect, the method optionally includes controlling the applicator assembly to automatically rotate on up to three different axes of rotation to maintain a predetermined angle of incidence between the applicator assembly and an application surface of the lens where the conductive ink may be to be applied. In another aspect, the method optionally includes controlling the applicator assembly to move independently on up to three separate axes to maintain the head at a predetermined distance from the application surface of the lens. In another aspect, the method optionally includes controlling the applicator assembly to automatically change orientation of the applicator assembly so that a nozzle of the applicator assembly may be oriented perpendicularly relative to the application surface of the lens.

In another aspect, the method optionally includes heating the lens to between 50 and 150 degrees C. for a predetermined period of time before the conductive ink is cured.

In another aspect, the method optionally includes heating the lens to a predetermined temperature for between 35 and 350 minutes before the conductive ink is cured.

In another aspect, the applicator assembly optionally includes an ink jet dispensing head configured to propel ink from the applicator assembly onto an application surface of the lens. In another aspect, the conductive ink may be applied to the application surface of the lens by the dispensing head, and wherein the dispensing head may be less than 5 mm from the application surface as the conductive ink is applied. The conductive ink may be applied by the dispensing head at less than 15 mm from the application surface of the lens. In another aspect, the dispensing head may be automatically controlled by the control circuit to dispense the conductive ink at between 6 mm and 14 mm away from the application surface of the lens as the dispensing head travels less than 40 mm across the application surface. In another aspect the conductive traces are optionally spaced at least 1 mm apart or more.

In another aspect, the method optionally includes determining a minimum turn angle for the pattern, wherein the minimum turn angle may be at least 20 degrees or more.

In another aspect, the method optionally includes determining a minimum turn radius for the pattern of traces to be applied to the lens, wherein the minimum turn radius may be at least 0.5 mm or more.

In another aspect, the method optionally includes determining a pad geometry for electrical pads to be applied to the lens, wherein the electrical pads are arranged and configured to electrically connect the conductive traces to a power connector. In another aspect, the pad geometry may be optionally rectangular and/or between 50 $mm^2$ and 200 $mm^2$. The pad may be between 0.05 mm and 1.5 mm in thickness.

In another aspect, the method optionally includes determining a height of the conductive traces applied to the lens. The height of the conductive traces may be automatically adjusted by the control circuit according to a width of the conductive traces and a location on the conductive traces on the lens. The height of the conductive traces is optionally between 0.05 and 0.5 mm, or the height of the conductive traces may be between 50 microns and about 150 microns.

In another aspect, the method optionally includes determining a variable trace width for the conductive traces to be applied to the lens, wherein the variable trace width varies as a function of the trace height and a location of the conductive traces on the lens. The variable trace width optionally varies as a function of the ink viscosity, ink thixotropy, and/or an amount of ink to deposit per unit length, or any suitable combination thereof.

In another aspect, the method optionally includes determining an amount of ink to deposit per unit length of the trace according to an ink flow rate and a travel speed of the applicator assembly. In another aspect, the flow rate of the conductive ink may be less than 30 mg/sec, and wherein the travel speed of the applicator assembly may be less than 75 mm/sec, or the flow rate of the conductive ink may be between 15 mg/sec to 70 mg/sec at less than 75 mm/sec nozzle speed.

In another aspect, the width of the conductive traces may be less than 1200 microns, or the width of the conductive traces may be between about 0.5 mm and about 1.5 mm.

In another aspect, the pattern of conductive traces defines a heating grid that includes multiple parallel loops of conductive traces. The heating grid may include at least 2 parallel portions and at least one corner portion electrically connecting the two parallel portions.

In another aspect, the method optionally includes modifying the proposed trace pattern for the lens according to maximum linear resistance of the conductive ink.

In another aspect, the method optionally includes controlling the nozzle to apply a first application of ink to the lens in a predetermined trace pattern; and optionally controlling the nozzle to apply a second application of ink to the lens, wherein the second application of ink may be applied over the first application of ink according to the predetermined trace pattern. The combined thickness of the conductive traces after the first and second application of ink may be 1 mm or less.

Further forms, objects, features, aspects, benefits, advantages, and examples of the present disclosure will become apparent from the accompanying claims, detailed description, and drawings provided herewith.

DETAILED DESCRIPTION

Figure 1:
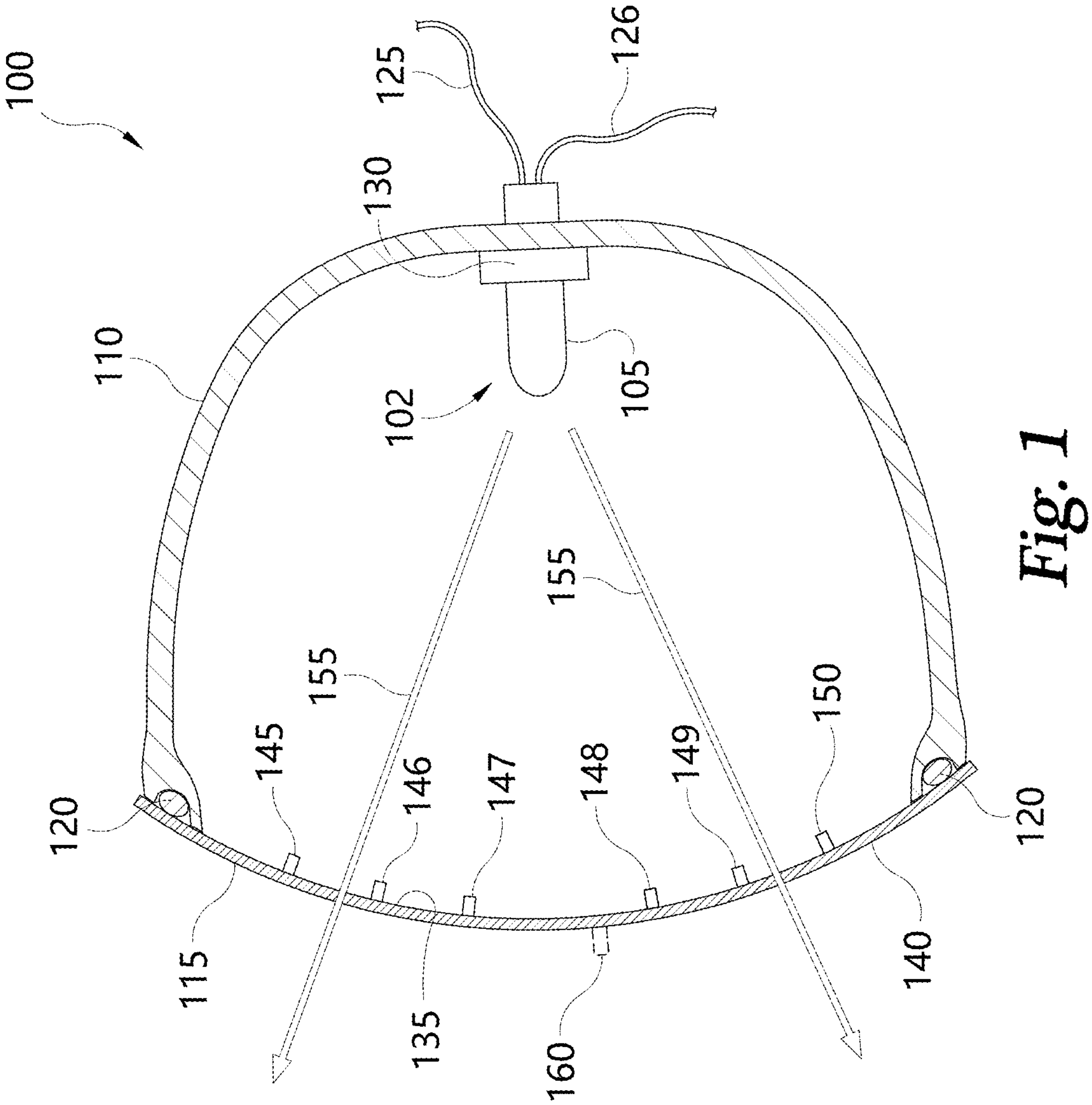
FIG. 1 is a cross-sectional view of one example of a head light assembly.

Illustrated at 100 is one example of a lamp assembly for a vehicle. As illustrated, a lamp 105 may be mounted to a housing 110, for example, with a light-emitting portion 102 inside the housing and held in place but if to the housing by a mount 130. The light-emitting portion 102 may be arranged and configured to generate and consequently transmit light rays 155, these light rays eventually passing outwardly away from lamp 105 and optionally through a light transmissive lens 115 mounted to front portion of housing 110. Housing 110 may be formed of any suitable material, and therefore may include metallic, nonmetallic, polymeric, or other such suitable materials which may be useful for retaining lamp 105 within housing 110 behind lens 115. Housing 110 may include reflective properties as well on its inside surface 112, and surface 112 may be shaped so as to focus or direct light rays 155 in any suitable way advantageous for the operation and use of lamp assembly 100.

In another aspect, the lamp assembly 100 may be arranged configured in any suitable position, such as on a vehicle, so that light rays 155 passing outwardly away from the lamp assembly 100 may be useful for providing illumination, warning, and the like. For example, lamp assembly 100 may be full as a headlamp for a vehicle such as a truck or a car, or in another aspect, lamp assembly 100 may be configured to operate as a turn signal lamp, or in other instances, as a tail lamp, brake lamp, rear illumination lamp, or cargo lamp for illuminating the cargo area of a trailer or truck, to name a few nonlimiting examples.

A power cable 125 may be electrically connected to a power source, such as a vehicle power circuit. In another aspect, a ground cable 126 may be electrically connected to a circuit ground, such as a frame or other circuit reference point of the vehicle, thus completing a power circuit providing power to lamp 105.

In another aspect, a sealing member 120 may be positioned between housing 110 and lens 115 to partially or fully seal the interior of housing 110 to reduce or eliminate the presence of contaminants or foreign object material such as moisture, dust, dirt, and the like. The sealing member 120 may comprise any suitable material such as rubber, polymeric material, and the like.

In another aspect, the lens 115 may define a curved cross-section with a curvature extending across the lamp 105. The lens 115 may also define an inside surface 135 which may be the portion of lens 115 that is inside housing 110 opposite, or across from, lamp 105. The lens 115 may also define an outside surface 140 which may be a surface outside housing 110. In another aspect, light rays 155 emitted by lamp 105 pass first through inside surface 135 and then through outside surface 140 as light leaves lamp assembly 100. Thus inside surface 135 may be defined as a first surface of lens 115 encountered by light rays 155 before the light rays exit lens 115 through a second surface such as outside surface 140. In another aspect, lens 115 may be formed from any suitable light transmissive material such as glass, or a polymeric material such as a polycarbonate compound. The light transmissive material may be clear or colored to transmit a particular color such as red, amber, and the like, or may include prisms, raised or recessed portions in various shapes or designs, or it may define other irregularities in the lens surface or cross-section which may be introduced to improve the intensity, focus, directionality, or other useful properties of light emitted by lamp assembly 100. In another aspect, lens 115 may be formed as a single unitary structure, or may be an aggregate of multiple separate structures retained together such as by an adhesive, ultraviolet or ultrasonic bonding, mechanical fasteners, or by other suitable means.

The lamp assembly 100 may include one or more conductive traces like conductive traces 145-150. These one or more electrically conductive traces may be positioned on any surface of the lens 115, such as on inside surface 135, and/or on outside surface 140. In another aspect, FIG. 1 illustrates an example of a light transmissive lens that defines a curved cross-section with a curvature extending across a length and/or width of the lens. In another aspect, lamp assembly 100 may be curved with the light transmissive lens defining a concave interior surface and/or a convex exterior surface, and the electrically conductive traces may optionally be positioned on the concave interior surface of the lens. The conductive traces 145-150 may be mounted adjacent the interior surface of the lens as illustrated to reduce or eliminate environmental effects on the traces, or, the conductive traces may optionally be mounted on the exterior outer surface of the lamp where such a mounting is advantageous (such as with trace 160). In another aspect, traces 145-150 may be mounted to or mounted adjacent lens 115.

In another aspect, the electrically conductive traces disclosed herein (such as traces 145-150 and others like them) may be primarily made of conductive silver ink. In another aspect, the disclosed electrically conductive traces, may extend outwardly away from the surface of the lens and have a thickness greater than 0.001 mm, greater than 0.01 mm, greater than 0.05 mm, or more.

In another aspect, the electrically conductive traces disclosed herein may individually, or collectively as an overall circuit, may have a resistance of greater than 10 ohms, greater than hundred ohms, greater than 500 ohms, or greater than 1000 ohms or more. For example, the conductive traces 145-150 may be made primarily of conductive silver ink, have a resistance of less than 500 ohms, and may extend outwardly away from the surface of the lens at a thickness of at least 0.03 mm. Any suitable combination of thickness, resistance, and conductive material may be useful depending on various factors including the size of the light transmissive lens, the number of traces, and how the lamp is intended to be used, to name a few nonlimiting examples.

In another aspect, the electrically conductive traces disclosed herein may define any suitable cross-sectional shape such. As illustrated, traces 145-150 optionally define a rectangular cross-sectional shape. Other shapes may be useful such as squares, partial oval's, half circles, irregular polygons, and the like are illustrated herein elsewhere and may also be used for traces 145-150. For example, traces 145-150 may be positioned on the light transmissive lens with a short edge of the rectangle closest to inside surface 135 of the light transmissive lens 115. By positioning the long axis of a rectangular electrically conductive trace generally parallel to light rays 155, the electrically conductive traces may thus advantageously minimize the light that is blocked by the presence of the conductive traces.

Figure 2:
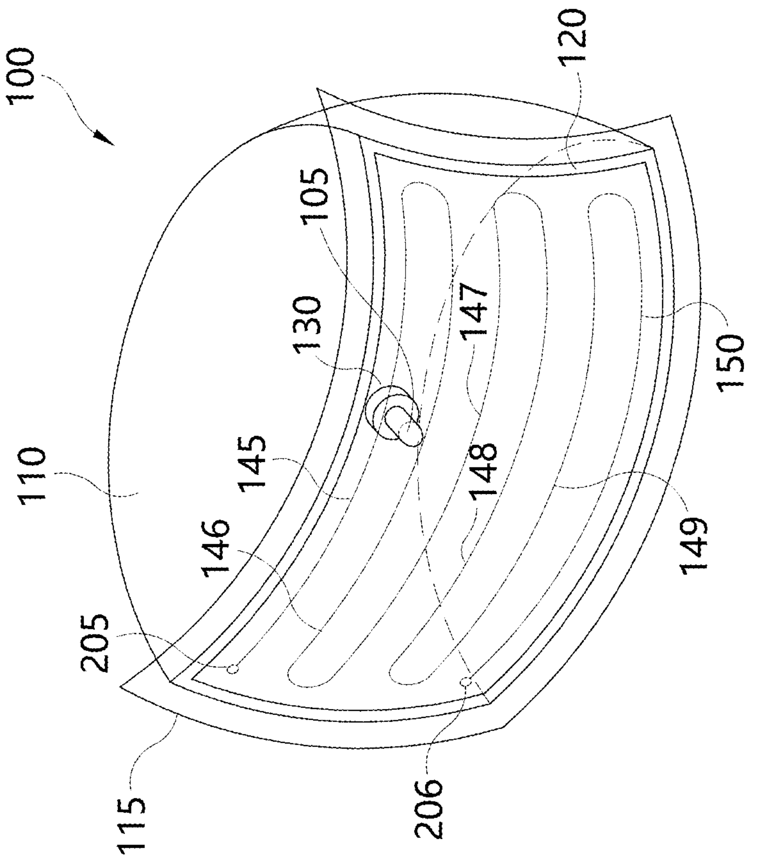
FIG. 2 is a perspective view of a head light assembly like the assembly of FIG. 1.

FIG. 2 illustrates other aspects of the lamp assembly 100 shown in FIG. 1. In one aspect, one or more electrically conductive traces 145-150 are positioned on a surface of the lens, the electrically conductive traces extending across and curving with the curvature of the lens. For example, the lens 115, curves across lamp assembly 100 in front of housing 110 with a concave shape defined by the length and/or width of lens 115. In another aspect, the lens may be planar across the length and/or the width of the lens.

In another aspect, conductive traces 145-150 may be electrically connected to one or more terminals 205 and 206. In this example, terminals 205 and 206 are electrically connected at opposite ends of the conductive circuit that includes traces 145-150. In another aspect, conductive traces mounted to the lens of lamp 100 may be thought of as separate traces 145-150, or as a single elongated trace rapping back and forth across lens 115. In either case, terminals 205 and 206 may be coupled electrically to power, and/or ground connections respectively thus creating a complete circuit through which electricity may flow from one terminal to the other so that electrically conductive traces 145-150 generate heat from the electric current. In this way, conductive traces mounted to lens 115 may be configured to generate heat adjacent one 15 to remove moisture such as fog, ice, and the like.

Figure 3:
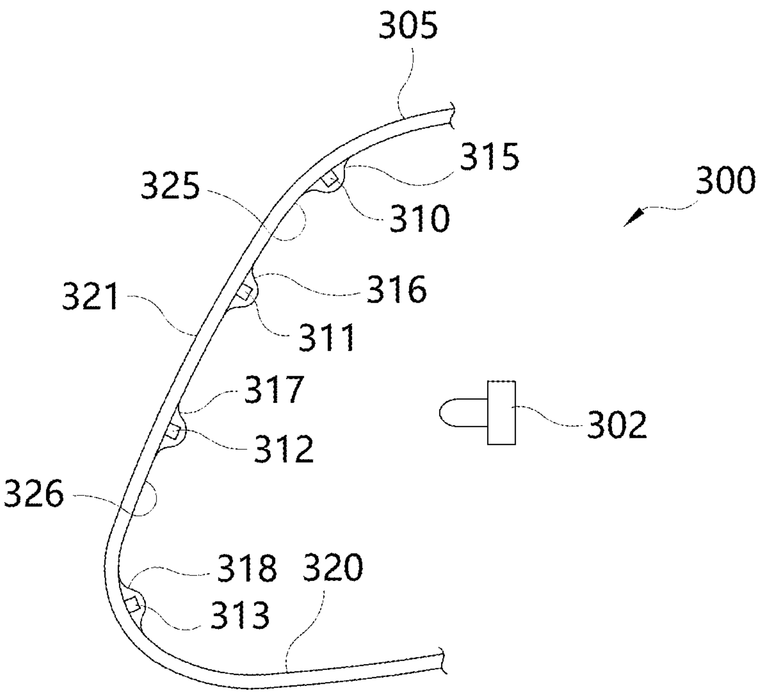
FIG. 3 is a cross-sectional view of another example of a head light assembly like those illustrated in the preceding figures.

Illustrated in FIG. 3, is a lens 300 illustrating aspects of an automotive headlamp lens that may also be included in any of the disclosed examples. A light transmissive lens 305 may be positioned in front of a lamp 302 such that the lamp 302 may project light rays outwardly toward an inside surface 320, the light rays passing through an outside surface 321 before leaving light transmissive lens 305 altogether. In this respect, inside surface 320 may be thought of as the surface of light transmissive lens 305 closest to lamp 302 and/or the first surface encountered by light rays from lamp 302.

In another aspect, conductive traces 310, 311, 312, and 313 may be positioned adjacent the inside surface 320 (or alternatively, outside surface 321) of the light transmissive lens. The conductive traces may, for example, be in direct contact with the surface of the lens, although direct contact is not required for heat to transfer from the conductive traces 310-313 to light transmissive lens 305.

In another aspect, one or more coatings may be applied to partially or fully cover the conductive traces mounted on the lens. These coatings may be transparent, semi-transparent, tinted, or may include other advantageous properties. For example, the one or more coatings covering the conductive traces may include a chemical compound useful for reducing or eliminating the formation of fog or other moisture buildup on the lens.

For example, a first coating 315 may partially or completely cover a first conductive trace such as conductive trace 310, and a coating 316 may partially or completely cover a second conductive trace such as conductive trace 311. The coating 315 may also cover a portion of light transmissive lens 305, leaving and uncoated region 326 between coating 315 and coating 316. Similarly, a coating 317 may partially or fully cover a conductive trace 312, and a coating 318 may coat a conductive trace 313 leaving and uncoated region 325 on the inside surface 320. In another aspect, portions of inside surface 320 of light transmissive lens 305 may be coated with a coating such as an anti-fog coating, while other portions may not be coated. Thus a first coating may cover the one or more electrically conductive traces, and the first coating may cover a portion of the lens surface leaving a separate second portion uncovered.

In another aspect, lens 300 may be curved with the light transmissive lens defining a concave interior surface and a convex exterior surface, and the electrically conductive traces may optionally be positioned on the concave interior surface of the lens, on the convex exterior surface, or both. The disclosed coatings 315-318 may therefore be positioned on the exterior surface of the lens, on the interior surface of the lens, or both.

Figure 4:
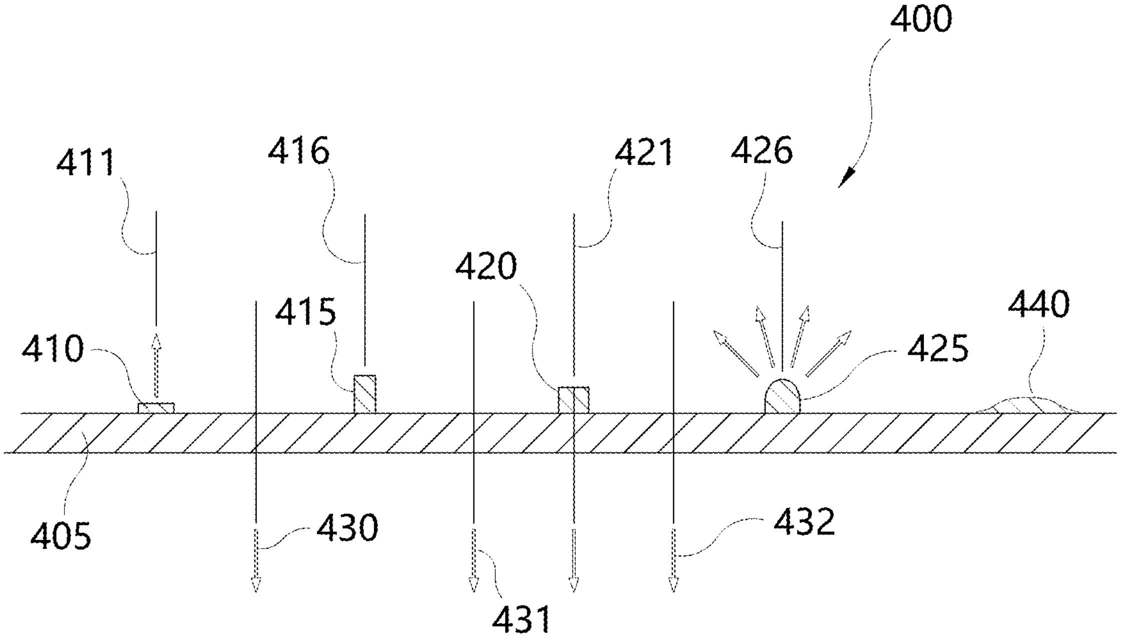
FIG. 4 is a cross-sectional view illustrating different types of conductive traces useful in light assemblies like those shown in the preceding figures.

FIG. 4 illustrates other aspects of conductive traces mounted to a light transmissive lens that may be useful in any of the disclosed examples of a vehicle lamp. Examples of conductive traces 400 are shown mounted adjacent, or directly to, a light transmissive lens 405 like other such light transmissive lenses disclosed herein elsewhere. In one example, a conductive trace 410 may be arranged and configured adjacent to light transmissive lens 405 with a cross-section that is wider than it is tall, that is, rectangular, and having the long side of the rectangle adjacent light transmissive lens 405. In this example, conductive trace 410 may be optically reflective reflecting light rays 411 coming towards conductive trace 410, such as from a lamp mounted behind light transmissive lens 405. In this example, light rays 411 may be reflected directly back towards the lamp in a direction opposite, or nearly opposite, to the original path traveled toward conductive trace 410. In another aspect, light rays 430-432 pass-through light transmissive lens 405 unobstructed by any of the disclosed conductive traces.

In another aspect, the disclosed conductive traces may include a rectangular cross-section such as conductive trace 415 where the short side of the rectangle is adjacent light transmissive lens 405 thus forming a trace that is taller than it is wide. In this example, trace conductive trace 415 may stand taller away from light transmissive lens 405 and project towards the light source which may allow for a conductive trace that has a similar volume as trace like trace 410 volume and is thus able to generate a similar amount of heat when powered, while obstructing fewer light rays 416 then would be obstructed by a trace like trace 410, or 420. Thus it may be advantageous to have traces on a light transmissive lens that are taller than they are wide thus standing further away from the lens surface but with a narrower cross-section. In another aspect, conductive traces as disclosed herein may be opaque or light absorbing like conductive trace 415 rather than light reflecting like trace 410. This property may be advantageous for capturing any available energy (however small) that is transmitted by light rays 416 to aid in the heating process.

In another aspect, conductive traces as disclosed herein may include a square cross-section with a height and width that is approximately equal like what is shown at conductive trace 420. In another aspect, conductive traces as discussed herein may be like conductive trace 420 with a partially or fully transparent property so that light rays such as light rays 421 may pass through the conductive trace with little to no obstruction, reflection, or absorption.

In another example, the conductive traces discussed herein may be of other shapes such as an oval, semi-oval, half circle, and the like, similar to conductive traces 425 and 440. Light rays 426 may be reflected in multiple directions from conductive trace 425 effectively scattering the reflected light, or in another example, light may be absorbed rather than scattered. The example at 440 illustrates an irregular polygonal cross-section, and it may be optionally configured to scatter, reflect, or transmit light as disclosed in the preceding examples shown in FIG. 4, and elsewhere.

In another aspect, the lens in FIG. 4 may be concave with a concave inner surface and a convex outer surface, or planer with substantially parallel inner and outer surfaces. As disclosed herein elsewhere, the conductive traces may be advantageously positioned on either the inner or outer surface of the lens, or on both surfaces.

Another example of a light transmissive lens with properties that may be included in any of the illustrated examples disclosed herein is shown at 500. In one aspect, conductive traces 510-514 may be mounted adjacent to a light transmissive lens 505. In another aspect, the disclosed conductive traces may be covered with multiple coatings with different properties. For example, conductive trace 510 may be partially or completely covered with first coating 515 optionally covering a portion of light transmissive lens 505. In another aspect, first coating 515 may optionally leave uncoated portions between coating 515 and 516, where the first coating over traces 510, and 511 optionally does not extend completely across the inside surface of lens 505. In another aspect, a second coating 520 may cover conductive trace 510, conductive trace 511, and possibly other conductive traces as well. Either the first or second coating, or both, may include chemical properties reducing or eliminating buildup of fog, droplets, or other obstructions on an inside surface of the lens. In another aspect, the first or the second coating may also be applied to adhere or otherwise retain conductive traces adjacent, or directly, to the light transmissive lens. This may also advantageously increase the heat transfer properties of the conductive traces to further reduce or eliminate fog, droplets, or ice buildup on either the inside or outside of the lens.

In another aspect, the lens at lens 500 may be concave with a concave inner surface and a convex outer surface. The conductive traces in the disclosed first and second coatings may be advantageously positioned on the concave interior surface of the lens, or optionally, on the outside convex surface of the lens, or both.

Figure 6:
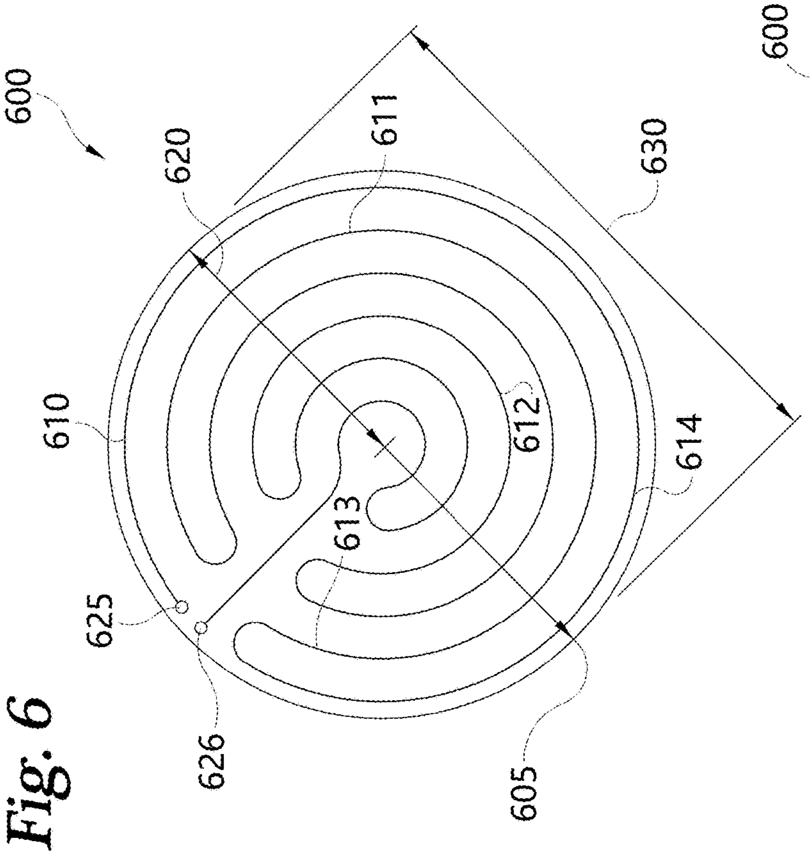
FIG. 6 is a front view of a light transmissive lens for a light assembly that is like those shown in the preceding figures.
Figure 7:
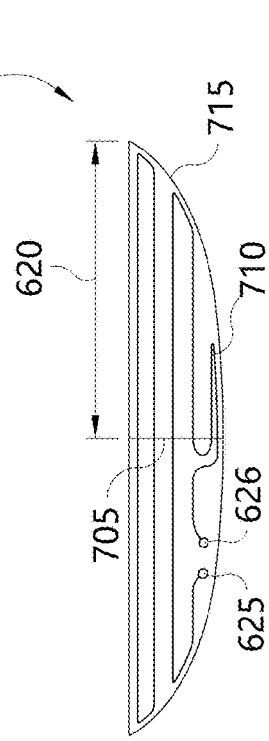
FIG. 7 is a cross-sectional view of the lens shown in FIG. 6.
Figure 5:
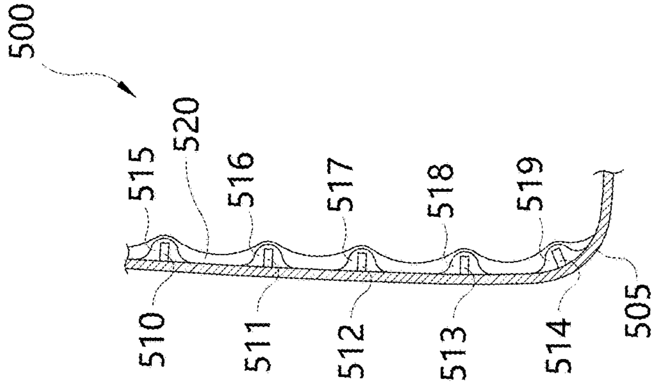
FIG. 5 is a cross-sectional view of one example of a light transmissive lens with conductive traces that is like those shown in the preceding figures.

Another example of a lens 600 is illustrated in FIGS. 6 and 7. In this example, lens 600 is generally circular in shape having a radius 620 and a diameter 605. Multiple conductive traces 610-614 may be included in mounted adjacent to lens 600 either on an inside surface or outside surface of the lens. As in the other examples disclosed herein, conductive traces 610-614 may also be thought of as a single conductive trace that winds its way around lens 600 in any suitable manner, only one of which is illustrated, such arrangement being illustrative rather than restrictive. A terminal 625 and terminal 626 may be included for connecting to power and ground connections which may apply electrical current through the conductive trace(s). Such conductive current may cause heating in the traces thus raising the temperature of lens 600 to reduce or eliminate fluid buildup either on the interior or exterior surface of the lens.

As illustrated in FIG. 7, lens 600 may have a curved cross-section such that the lens defines an arc 715 with an outside surface 710. With an arcuate cross-section, lens 600 may also define a depth 705 giving the lens a depth as well as an approximately equal length and width according to the generally circular shape of the lens. In another aspect, the lens diameter 605 (which here corresponds to with 630) may be less than or equal to 2 inches, greater than 2 inches, greater than 4 inches, greater than 6 inches, or more. In another aspect, lenses disclosed herein which may be round, rectangular, L-shaped, or any other suitable shape, may define surface area that is less than or equal to 40 square inches, greater than 40 square inches, greater than 60 square inches, greater than 100 square inches, or more. For example, lens 600 may be about 4 to 4½ inches in diameter with a surface area of 65 square inches, or more.

Figure 8:
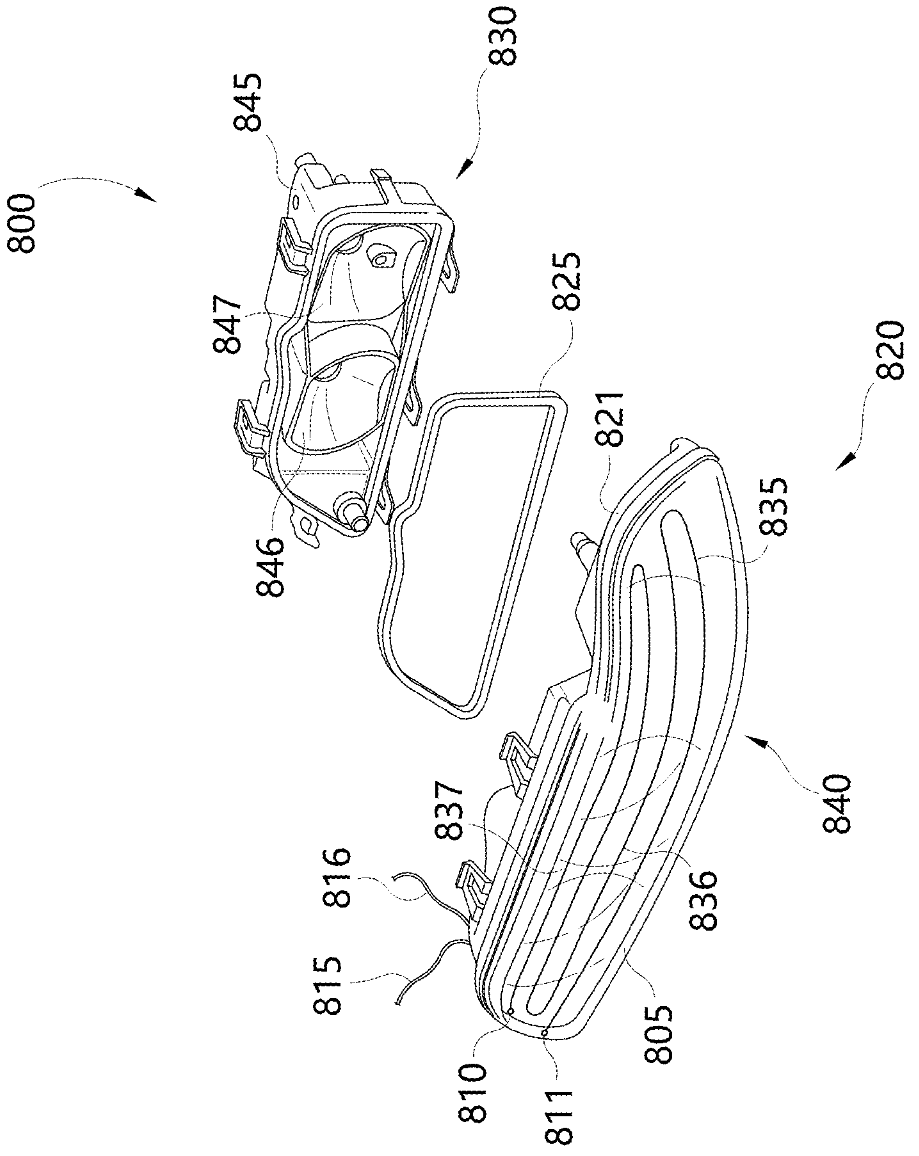
FIG. 8 is a front exploded view of a head light assembly like those shown in the preceding figures.
Figure 9:
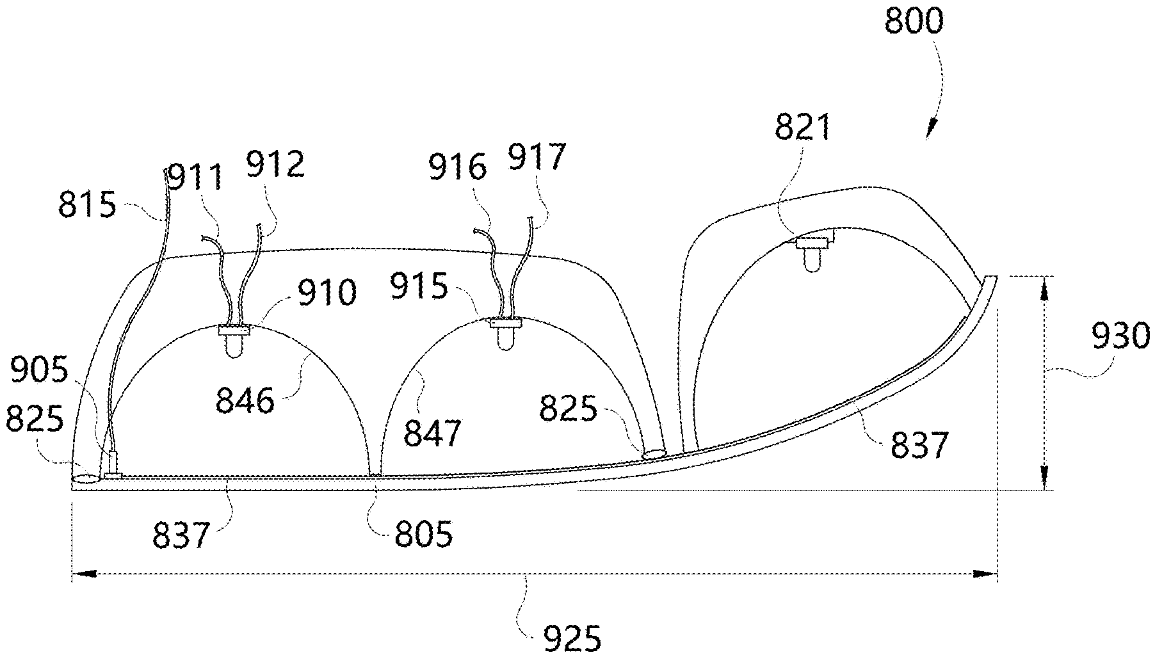
FIG. 9 is a top cross-sectional view of the head light assembly of FIG. 8.
Figure 10:
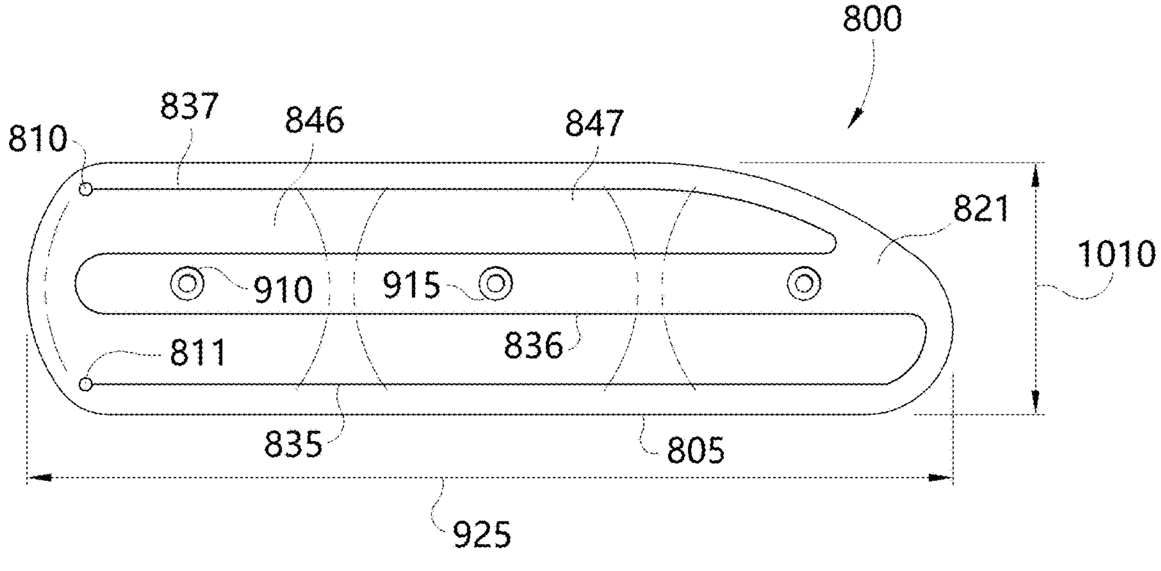
FIG. 10 is a front view of the head light assembly of FIGS. 8 and 9.

Another example of a lamp assembly 800 is illustrated in FIGS. 8, 9 and 10. A lamp assembly 800 optionally includes a lens assembly 820, a sealing member 825, and a lamp mounting assembly 830, all of which may be configured to couple together by any suitable means. The lens assembly 820 may include a light transmissive lens 805 according to any of the examples illustrated herein and described elsewhere. A terminal 810 and terminal 811 may also be included and configured to electrically connect to power cable 815 and ground cable 816 respectively in order to complete electric circuit with conductive traces such as 835-837. lens assembly 820 optionally includes a turn signal lamp mount 821 that may include a turn signal bulb or other such lamps.

In another aspect, lens assembly 820 may also be curved, such as in a general L-shape, thus defining a corner region 840 where the lamp bends around at nearly right angles to accommodate the corner shape of the vehicle. Such an L-shape is optional, as some headlamp assemblies like the one disclosed may not include this configuration corner configuration.

In another aspect illustrated in FIG. 9, lamp assembly 800 may include an optional lamp mounting assembly 830 having an optional lamp mount 845 that may include one or more reflectors 846 and 847. In another aspect, lamps 910 and 915 like those disclosed herein elsewhere, may be mounted at the rear portion of the reflector 846 and reflector 847 individually. Lamps 910 and 915 may be electrically connect to power via power and ground cables 911, 912, 916, and 917. The reflector 846 and reflector 847 may be advantageously shaped and configured to direct light rays from lamps mounted at the rear portion of the reflector to focus and direct light passing through lens assembly 820 and light transmissive lens 805 in particular.

Aspect, lamp assembly 800 may include a power terminal 905 configured to receive power from power cable 815 and two electrically connect with terminal 810 of the lens 805 thus providing power to traces mounted to light transmissive lens 805. In another aspect illustrated in FIG. 10, traces 835-837 may extend across a length 925 of the lens 805, and across its depth 930 as the traces wrap around the corner region 840 and onto the corner portion of the L-shaped lens. In another aspect, traces 835-837 may extend across a width 1010 of the lens.

The disclosed deicing concept includes an electro-thermal process by which a heating element with one or more electrically conductive traces may by positioned on a lens to generate heat across the surface of a lens. The disclosed traces may include a conductive ink laid in a predetermined pattern to maximize heat transfer to the lens surface. In another aspect, the conductive ink may be applied to the lens using a non-contact spray technology whereby the applicator applies the conductive ink without making direct contact with the lens.

Figure 11:
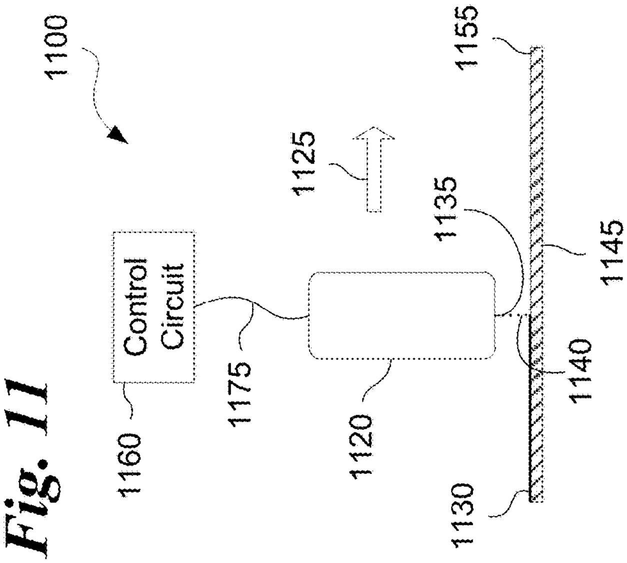
FIG. 11 is a component view of an applicator assembly for applying the disclosed conductive traces to the surface of a lens.

An example of this concept is illustrated in FIG. 11 where an applicator assembly 1100 optionally includes a nozzle 1120 for directing a flow of conductive ink 1140 onto a surface 1155 of a lens 1145. The nozzle optionally includes a single orifice at 1135 for providing the flow of ink 1140, or the nozzle may include multiple orifices at 1135 for providing the flow of ink. The movement of the applicator assembly may be controlled by a control circuit 1160 Control circuit 1160 may be include any aspects of control circuits disclosed herein, and is optionally configured to automatically determine or calculate operational parameters based on input from a user, or the current values of operational parameters already in place. Control circuit 1160 may communicate with other portions of the applicator assembly 1100 via communication link 1175 which may include wireless, wired, or other suitable modes of communication for transferring control signals or commands.

The conductive trace 1130 may be applied to the lens as the assembly 1100 moves across the surface of the lens, such as in the direction 1125 moving left to right in this illustration. The resulting conductive trace 1130 may include any of combination of the properties for conductive traces as disclosed herein elsewhere and may be arranged in any suitable pattern or shape on the surface of the lens, and may define any suitable cross-section. In another aspect, the conductive ink may be applied "wet" and then be cured such as by subjecting the ink and lens to temperatures sufficient to harden or cure the ink. The cured conductive ink pattern may then be powered electrically to generate the necessary heat for deicing.

Any suitable conductive or resistive ink or lens material may be used in the disclosed method. For example, the lens may comprise a polymeric material such as Polycarbonate, Polyvinyl chloride, or Polymethyl methacrylate to name a few nonlimiting examples. In another aspect, the cured ink may also be coated with an anti-fog or other anti-moisture coating as disclosed herein. In another aspect, the conductive ink may be applied directly to the surface of the lens material, or in another example, applied to a lens that includes one or more intervening coatings are layers of other material on the surface of the lens. As disclosed herein elsewhere, direct contact between the ink and the surface of the lens is preferable but is not required to create the advantageous heat transfer from the conductive traces to the lens. In another aspect, the lens may be coated with other coatings after application of the conductive traces. Such coatings include a hard coating, and anti-fog coating, and the like. These coatings may be applied to the same side of the lens material that the traces are applied to, or to other sides of the lens material where traces are absent.

In another aspect, the traces may obtain power via terminals nested in the headlamp housing which may be configured to correspond with contact terminals or contact pads on the lens that are electrically connected to the traces. For example, one pad or terminal may be electrically connected to one end of the trace or traces, while another pad or terminal may be electrically connected to another end of the traces thus provided a complete electrical circuit configured to allow power to flow through the traces.

The disclosed lens materials, lens geometries and ink application processes interact with each other and may include certain constraints that may be taken into consideration in applying the traces to a lens. These constraints may differ for different applications and may be accounted for in different ways depending on a variety of factors, examples of which are discussed herein.

Figure 12:
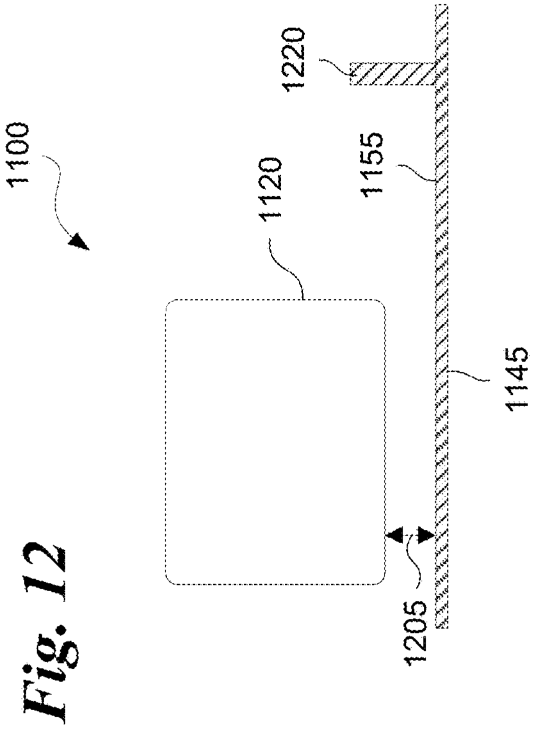
FIG. 12 is a second view of the applicator assembly of FIG. 11.

In one aspect, the constraints may include a Maximum Print Area (MPA) which may be defined by the interaction between the geometry and shape of the lens 1145, size and geometry of nozzle 1120, the maximum print height or separation between the nozzle and print surface 1155 of the lens, and others. The disclosed process optionally controls the maximum separation between the tip of the nozzle and that of the printing surface, illustrated in FIG. 12 as 1205. This separation may be adjusted from 0 to a maximum separation value that depends on a number of other factors such as the viscosity of the ink, the movement speed of the nozzle 1120, the angle of the nozzle relative to the lens surface, and possibly others. In one example, greater separation 1205 between the nozzle 1135 and the surface 1155 may result in increased likelihood of cosmetic and functional trace defects, while smaller values may reduce or eliminate these negative outcomes.

Generally, the effect of separation 1205 on the consistency of the resulting trace 1130 may be affected negatively if the separation 1205 is too great or too small when taking into consideration other factors as well. For example 1205 may be less than 1 mm, less than 5 mm, less than 10 mm, or alternatively, 10 mm or more. In another example, the maximum separation for 1210 may vary from a low of about 5 to about 10 mm to a high of about 10 mm to about 15 mm. Any suitable separation 1205 may be used.

In another aspect, the disclosed method may include configuring the control circuit for an optional temporary additional increase above the normal operating distance for a predetermined short trace distance. For example, the control circuit may be configured either automatically or by user input to allow the applicator assembly to operate at an above normal distance from the lens surface to apply a portion of the trace 1130 that is less than 100 mm, less than 50 mm, or less than 10 mm. This may be referred to as a localized maximum deviation for separation 1210 and it may be automatically determined by the control circuit 1160 or by input provided by an operator. Such a localized maximum deviation may be suitable even if the concerned area is hidden from view when the lens is mounted into position. Such deviations may be allowed, for example, to handle geometrical obstacles for assembly 1100 like obstacle 1220 which may be a tab, snap, or other irregularity which may rise from the surface or from an edge of the lens. Such an irregularity 1220 may be formed as part of the lens, or a separate item coupled to the lens mechanically by friction, by fasteners or clips, by adhesives, and the like.

Figure 13:
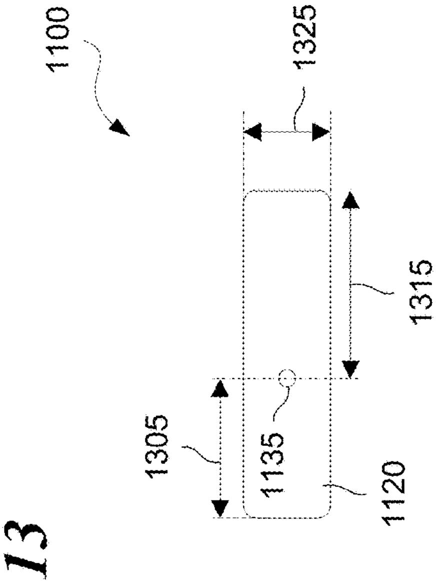
FIG. 13 is a third view of the applicator assembly of FIG. 11.

In another aspect, the constraints may include the geometry of the assembly 1100 such as the geometry between nozzle 1135, camera 1115, or other similar aspects. Referring to FIG. 13 which shows the assembly 1100 from below (that is, looking up from the lens surface toward the nozzle), the head 1120 defines a distance 1305 from the center of the nozzle 1135 to a front edge of the head, and a distance 1315 from the center of the nozzle 1135 to a back edge of the head. Any suitable arrangement or sizing for the applicator assembly may be used, but the method of applying the traces disclosed herein may be configured to take these dimensions into account to avoid negative outcomes such as any portion of the head assembly 1100 contacting the lens during the application process. In these examples, the constraints on the distance from the nozzle opening to the front and back edges of the nozzle may dictate how close the printing position of the nozzle can be in relation to the lens. In another aspect, this is applicable when the lens includes features that extend away from the surface of the lens to a distance that exceeds the maximum printing distance. In one example, this constraint may be relevant when an irregularity on the lens extends more than a predetermined distance away from the lens. In other instances, if the height of an irregularity does not exceed this maximum printing distance, the geometry and size of the nozzle or other portions of the head assembly 1100 may not be relevant in preparing the lens for application of the traces.

Figure 14:
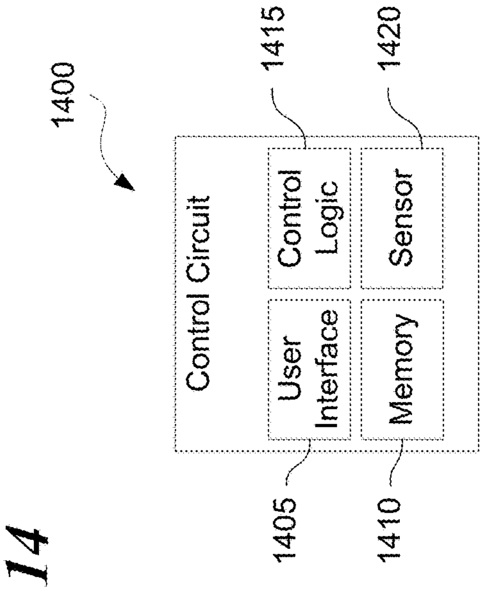
FIG. 14 is a component diagram with examples of components that may be included in the control circuit of FIG. 11.

FIG. 14 illustrates some examples of components that may be included in the control circuits disclosed herein. The disclosed control circuits are optionally arranged and configured to control the disclosed applicator assembly at 1400 as well as possibly other aspects of the application process. In one aspect, the control circuit may include, or be configured to provide, a user interface 1405 for accepting input defining aspects of the application process such as trace patterns, attributes of the conductive ink, timing and/or distance or other operating parameters for the applicator assembly, and the like. An optional memory 1410 for storing any or all operational parameters, operating history, and the like may also be included. The memory may retain relationships between particular lenses and trace patterns specific to those lenses. Control logic 1415 may be included, and may optionally include any suitable arrangement of processors, logic gates, microcontrollers, or other controller circuitry for providing control signals or commands to the disclosed applicator assembly. Control circuit 1400 may include optional sensors 1420 responsive to aspects of the application process discussed in further detail elsewhere such as flow rate of the ink, volume of ink applied, temperature of the ink, the viscosity of the ink, resistivity of the traces, power dissipated by the traces, and others. These sensors may obtain information before application of the ink, during application, or after the application of the traces is complete.

FIGS. 15-18 illustrates examples of applicator assemblies in operation applying traces to light transmissive lens according to the present disclosure. In addressing these constraints, an applicator assembly like those disclosed herein may move in any suitable manner to apply the conductive traces while accounting for constraints imposed by aspects of the process such as the geometry of the lens, the pattern of the traces to be applied, the viscosity of the conductive ink, and the like.

Figure 15:
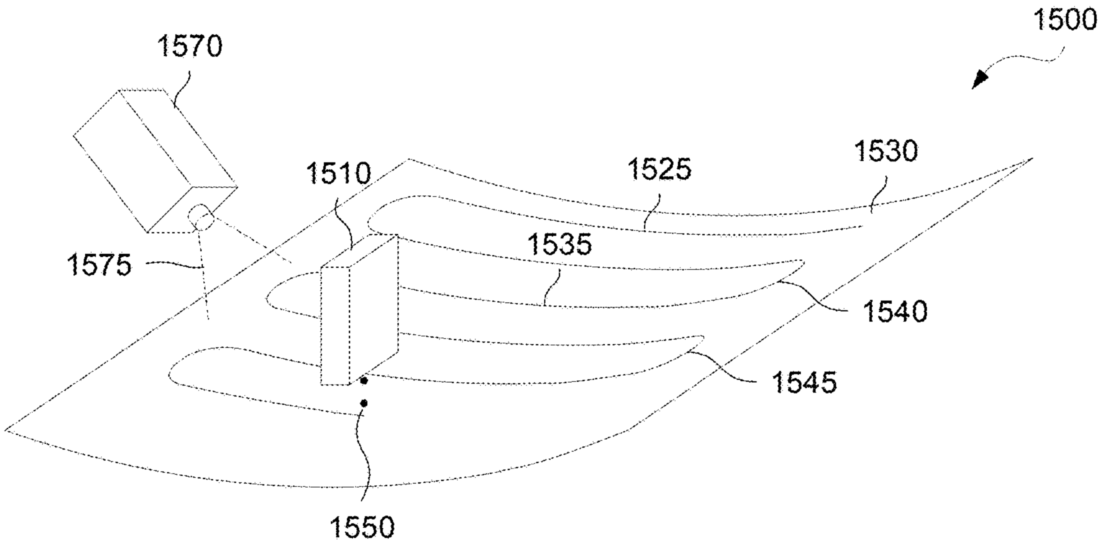
FIG. 15 illustrates an applicator like the one in FIG. 11 applying the disclosed conductive traces to a lens surface.

One example of the disclosed process in operation is illustrated in FIG. 15 at 1500. An applicator assembly 1510 like those disclosed herein elsewhere is moving across the surface of a lens 1530 providing a flow of conductive ink 1550 to form one or more traces. Examples of these traces appear at 1525, 1535, and elsewhere as well. The applicator assembly may move in any suitable direction and/or rotate as needed into any suitable orientation in order to follow the contour of lens 1530 depositing the ink at any desirable distance away from the lens surface as discussed herein elsewhere.

In another aspect, a camera 1570 defining a field of view 1575 may be arranged and configured to capture moving or still images of the operation of the nozzle or other aspects of the assembly and/or the application process. This image capture may occur before, during, or after application of the traces is completed, or any combination thereof. In another aspect, the camera 1570 may be configured to capture images visible to the human eye, or other images obtained by capturing electromagnetic radiation that is beyond detection by the human eye. In one example, camera 1570 is optionally responsive to light in the infrared region of the electromagnetic spectrum. In another example, camera 1570 is optionally a multi-spectrum camera capable of simultaneously obtaining images based on light visible to the human eye, and other light such as infra-red light rays. Camera 1570 may be configured to move with applicator assembly 1510 to provide real time feedback on the operation of the applicator as the traces are laid down. In another aspect, camera 1570 may be configured in a stationary location relative to applicator assembly 1510 to observe a portion of the lens surface and application process. In another aspect, multiple cameras 1570 may be include and arranged in different locations with differing fields of view. The multiple cameras may be configured to move with applicator 1510 each observing a different field of view relative to the applicator assembly 1510 as the applicator head moves.

A control circuit as disclosed herein may optionally accept input storing and providing the option to manually or automatically define the pattern of traces, and to automatically control the movement of applicator assembly 1510 to apply one or more traces 1525, and 1530. The traces optionally include multiple turns such as turns 1540, and 1545 to define a grid pattern. The grid pattern may optionally be of any suitable geometric shape such as generally rectangular as shown in FIG. 15, or as generally circular as shown in FIGS. 6 and 7, or around a corner as shown in FIGS. 8-10.

Figure 16:
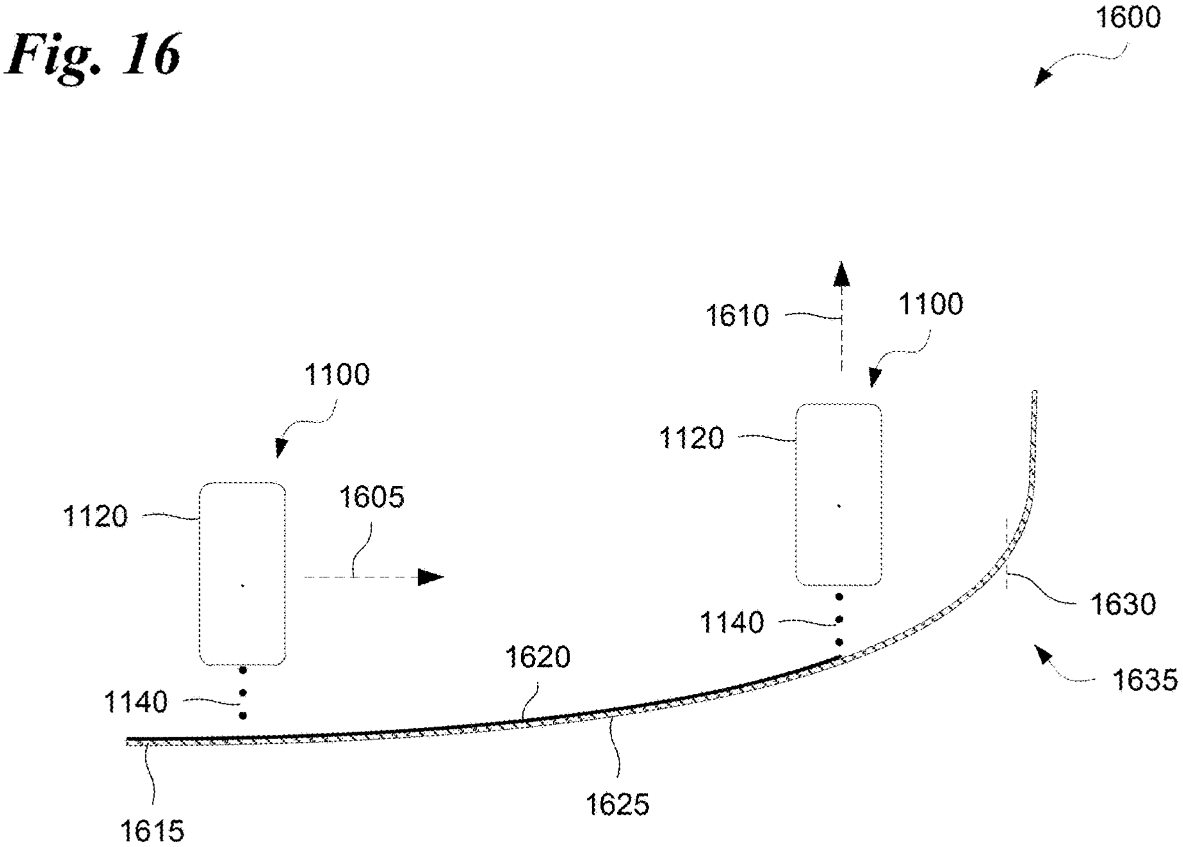
FIG. 16 is another view of an applicator assembly like the one shown in FIG. 11 applying a conductive trace to a lens.

Referring to the preceding figures, another example of the disclosed process in operation is illustrated at 1600 in FIG. 16. In this example, applicator assembly 1100 is shown traversing across the surface of lens 1625 to apply conductive trace 1620 to the lens. Lens 1625 may include a lens wall 1615 that curves to form a right angle and a corner region 1635. In this example, applicator assembly 1100 moves in the direction of 1605. In order to maintain a preferred distance from the lens for the proper application of ink 1140, applicator assembly 1100 may also move in the direction of 1610. As the lens curves in the direction of 1610, the assembly optionally automatically shifts away from the lens in the direction of 1610 while traversing along a predetermined path for the trace.

In another aspect, applicator assembly 1100 may also move in a direction perpendicular to both 1605 and 1610 (or directly into or out of the page in this illustration). As illustrated, accounting for the constraints discussed herein elsewhere related to size and position of the applicator assembly, the process automatically accounts for the physical interference that may be caused by the dimensions of the applicator assembly. Thus the system may impose a limitation 1630 defining the closest location that a trace may be applied to lens 1615 in this particular arrangement for a particular applicator assembly.

Figure 17:
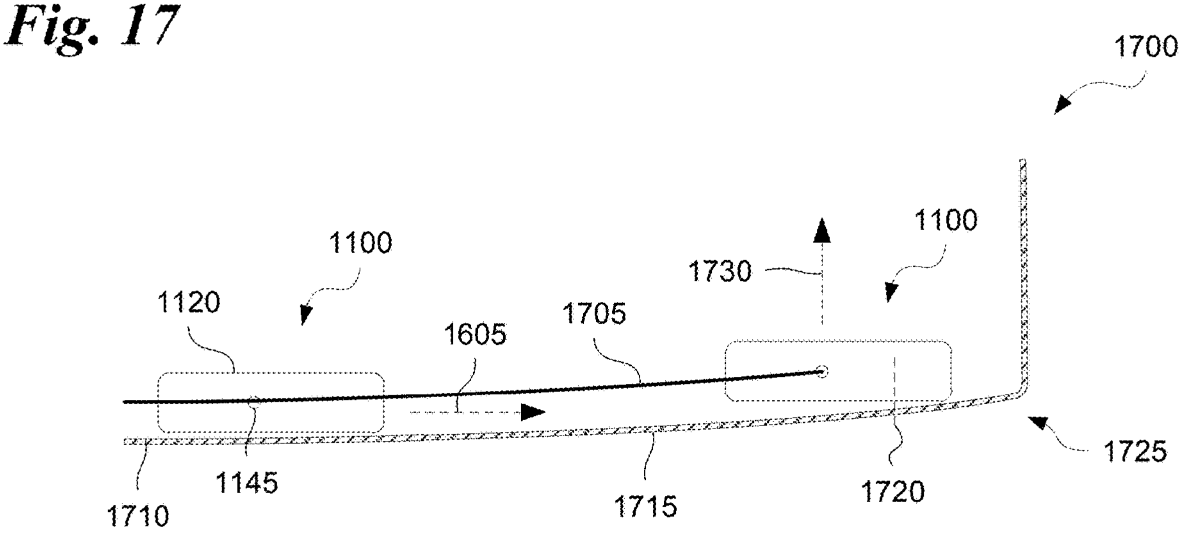
FIG. 17 is another view of an applicator assembly like the one shown in FIG. 11 applying a conductive trace to a lens.

Referring again to the preceding figures for context, another example of the disclosed process in operation is illustrated at 1700 in FIG. 17. In this example, applicator assembly 1100 is shown as it might appear looking from the side of the lens opposite the applicator assembly. The assembly 1100 here traverses across the surface of the lens 1715 in the direction 1605. The lens 1715 includes a lens wall 1710 that curves to form a right angle and a corner region 1725. In this example, the control circuits automatically account for the dimensions of applicator assembly 1100 by moving in the direction of 1605, and in the direction of 1730 (analogous to moving into or out of the page in FIG. 16) in order to avoid the lens wall 1710. As the lens curves toward the applicator assembly, the assembly may be programmed to automatically shift away from the lens in the direction of 1730 while traversing along the path of trace 1705. In another aspect, the control circuits disclosed herein may automatically calculate, or accept input defining, a limitation 1720 defining the closest location that a trace may be applied to lens 1715 in the corner region 1725.

FIGS. 18-22 offer further examples of different ways the disclosed applicator assemblies may be oriented to achieve the preferred trace pattern on a lens. At 1800 in FIG. 18, the disclosed applicator assemblies represented here as assembly 1850 may move or rotate along any suitable axis, such as axes 1805, 1810, and/or 1815. The applicator assembly may simultaneously move or rotate parallel to one axis, two axes, or in all three axes as needed to follow the contour of a lens depositing the ink from a preferred distance away from the lens surface 1830 as discussed herein elsewhere.

Figure 18:
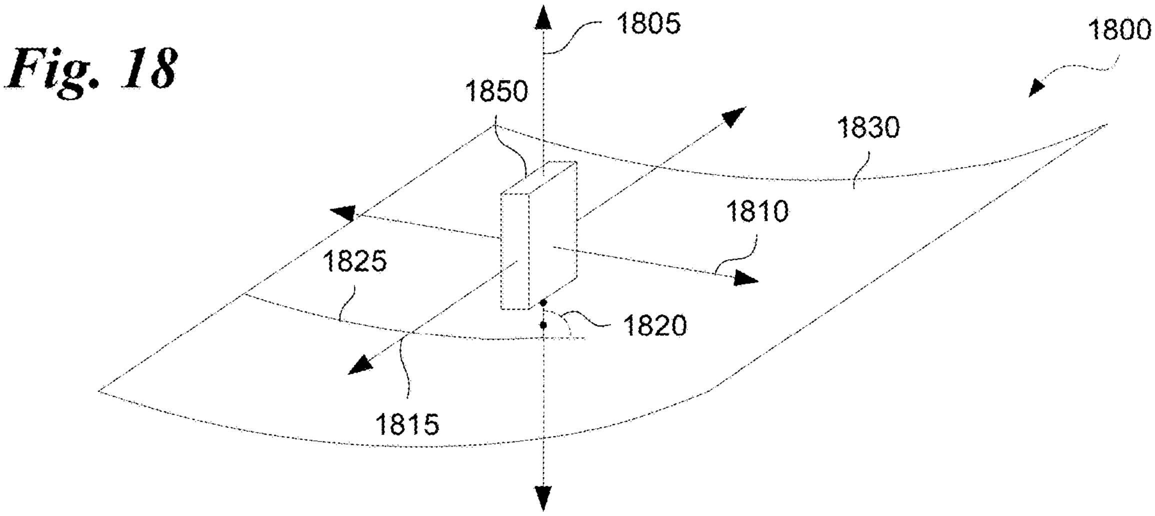
FIG. 18 illustrates aspects of an orientation of an applicator assembly of the preceding figures relative to a lens surface while applying conductive ink.
Figure 19:
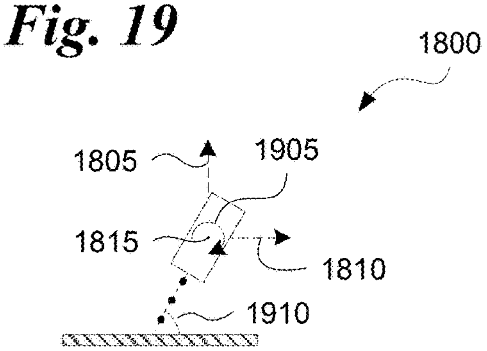
FIG. 19 illustrates another example of an orientation of an applicator assembly of the preceding figures relative to a lens surface while applying conductive ink.
Figure 20:
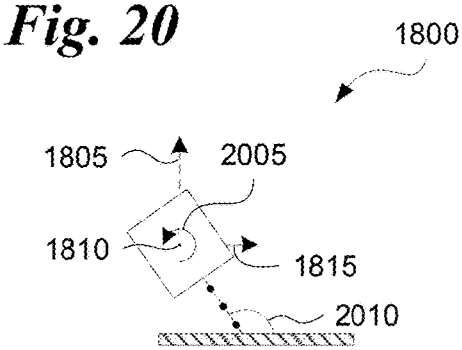
FIG. 20 illustrates another example of an orientation of an applicator assembly of the preceding figures relative to a lens surface while applying conductive ink.

The applicator assembly 1850 may also move or rotate as described to maintain a preferred angle of incidence 1820 between the stream of ink and the surface of the lens. In FIG. 18, the angle of incidence 1820 is about 90 degrees, but this is merely exemplary and not restrictive as any suitable angle may be achieved according to the disclosed method. For example, as shown in FIG. 19, the applicator rotates on axis 1815 in the direction of 1905 thus applying the ink at an angle 1920 that is less than 90 degrees relative to the surface of the lens and axis 1810. In FIG. 20, the applicator assembly is rotated on axis 1810 in the direction of 2005 to apply the ink at an angle 2010 which is greater than 90 degrees relative to the surface of the lens and axis 1815.

Figure 21:
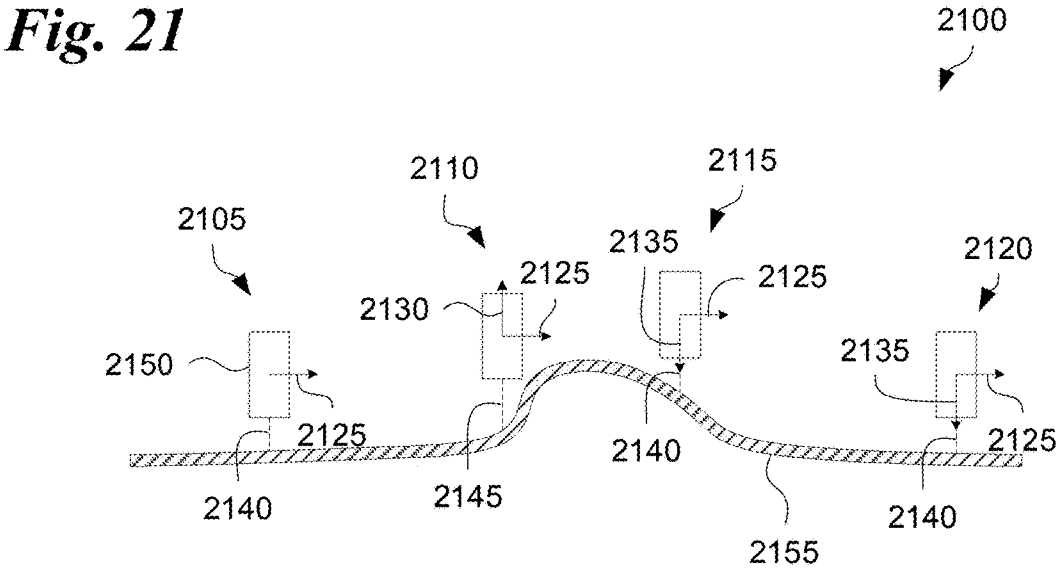
FIG. 21 illustrates another example of an orientation of an applicator assembly of the preceding figures relative to a lens surface while applying conductive ink.

Another example of the disclosed applicator assembly (here represented as 2150) is illustrated at 2100 in FIG. 21 as it changes position relative to a lens 2155. In this example, applicator assembly 2150 begins apposition 2105 applying a stream of ink at eight preferred distance 2140 from the lens surface. The applicator assembly transitions in the direction of 2125 according to instructions programmed into the disclosed control circuit(s). As the applicator approaches position 2110, the assembly traverses in the direction of 2130 as it also moves in the direction of 2125 In order to avoid obstructions in the contour of the lens surface. In this example, the applicator assembly may change the preferred application distance from 2140 to 2145 as the applicator assembly moved in the direction of 2125. This change in application distance may be automatically determined by the control circuit, or provided as user input. In either case, adjusting the application distance may be helpful in avoiding contact between the applicator assembly and the surface of the lens while optionally maintaining the applicator assembly in its present orientation throughout its path across the lens surface. In this example, the angle of incidence for the ink applied in the area of 2110 changes from about 90 degrees to an angle less than 90 degrees as the applicator assembly maintains its orientation relative to 2130. The disclosed control circuits may maintain maximum and minimum angles of incidence so that in programming the movements of the applicator assembly, the control circuit may automatically warn the user when the angle of incidence for the stream of ink exceeds these maximum and minimum parameters. This determination is preferably made prior to the application process so as to avoid the possibility of the applicator assembly stopping in the middle of the application process to avoid exceeding the maximum or minimum angles. In one example, the system automatically notifies the user inputting traces into a user interface that the proposed path exceeds either the maximum or minimum application angles, or both.

At 2115, the applicator assembly has peaked above the obstruction in the lens surface, and begun moving in the direction of 2135 as it moves in the direction of 2125 as well. In this position, the applicator assembly has optionally returned to the application distance 2140 having cleared the obstruction. The applicator assembly optionally then continues on to 2120 continuing to move in the direction of 2125, and 2135 in order to follow the contour of the lens at the preferred application distance 2140.

Figure 22:
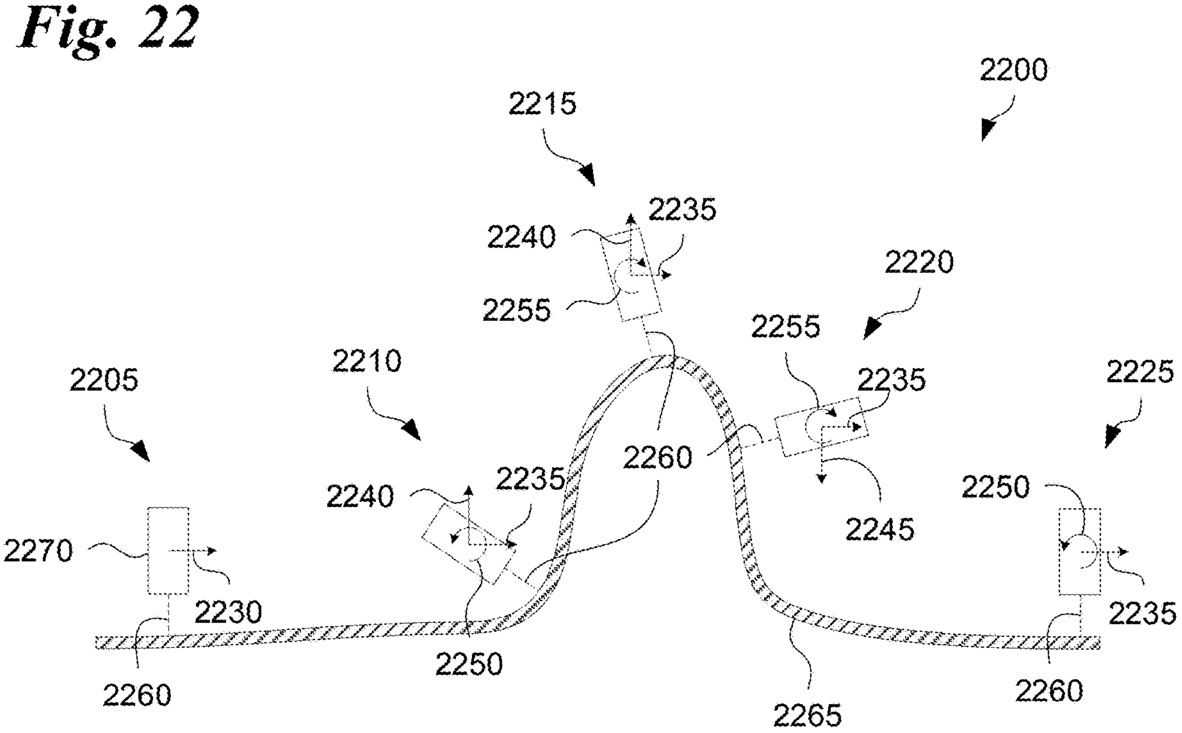
FIG. 22 illustrates another example of an orientation of an applicator assembly of the preceding figures relative to a lens surface while applying conductive ink.

Another example of the disclosed applicator assembly (here represented as 2270) is illustrated at 2200 in FIG. 22 as it changes position relative to a lens 2265. Add an initial location 2205, applicator assembly 2270 applies a stream of Incas disclosed herein from a preferred distance 2260 from the surface of the lens. Applicator assembly moves in the direction of 2230 toward an irregularity in the service of the lens. In this example, the applicator assembly is configured and arranged to traverse both in the direction of 2240 and in the direction 2235, while also optionally rotating in the direction 2250 as it approaches the irregularity in the lens. In this example, a preferred angle of incidence (such as about 90 degrees) and a preferred application distance 2260 may be maintained throughout the application of the trace by rotating the applicator assembly in the direction 2250, or 2255 as needed while the applicator assembly traverses the proposed path across the lens.

For example, as the applicator assembly traverses over the irregularity in the lens, the control circuit may automatically adjust movement of the applicator assembly in the direction of 2235 and 2234, and rotation first in the direction 2250, and then in the direction 2255 to arrive at 2215. From this position, the control circuit may control the applicator assembly to further rotate in the direction 2255 as the applicator assembly traverses in the direction of 2235 and 2245 to arrive at location 2220. The control circuit may further rotate in the direction of 2250 and traverse in the direction of 2235 and 2245 to arrive at location 2225 thus having applied the disclosed conductive traces to an irregularly shaped surface with multiple corner regions and obstructions while maintaining a preferred angle of incidence for the stream of ink, and a preferred distance of application between the applicator assembly and the service of the lens. The timing of changes to the direction of traversal and rotation, the preferred angle of incidence, the preferred distance between the applicator assembly and service of the lens, and other constraints may be accepted as user input from a user using the disclosed user interfaces. In another aspect, these constraints may be automatically calculated based on a subset of the constraints provided by the user used in conjunction with contour maps of the lens surface provided to the control circuit. In this way, the control circuit may automatically determine an optimum sequence of movements, and/or rotational changes to the applicator assembly that comply with these and other constraints disclosed herein.

In another aspect, the application of the traces according to FIGS. 11-22 may be obtained by any suitable relative movement between the applicator assembly and the surface of the lens. For example, in any of the disclosed processes, the lens may remain stationary, and the applicator may move as illustrated. In another example, the applicator assembly may remain stationary and the lens may be moved as illustrated. In another aspect, the applicator assembly may move, and the lens may move as well to achieve the application of traces as disclosed herein. In another aspect, the relative movements of the applicator assembly and/or lens include traversal or rotation in any suitable direction, or in any suitable combination of rotation and traversal. These movements may be coordinated by the control circuit to achieve the desired pattern of traces.

Figure 23:
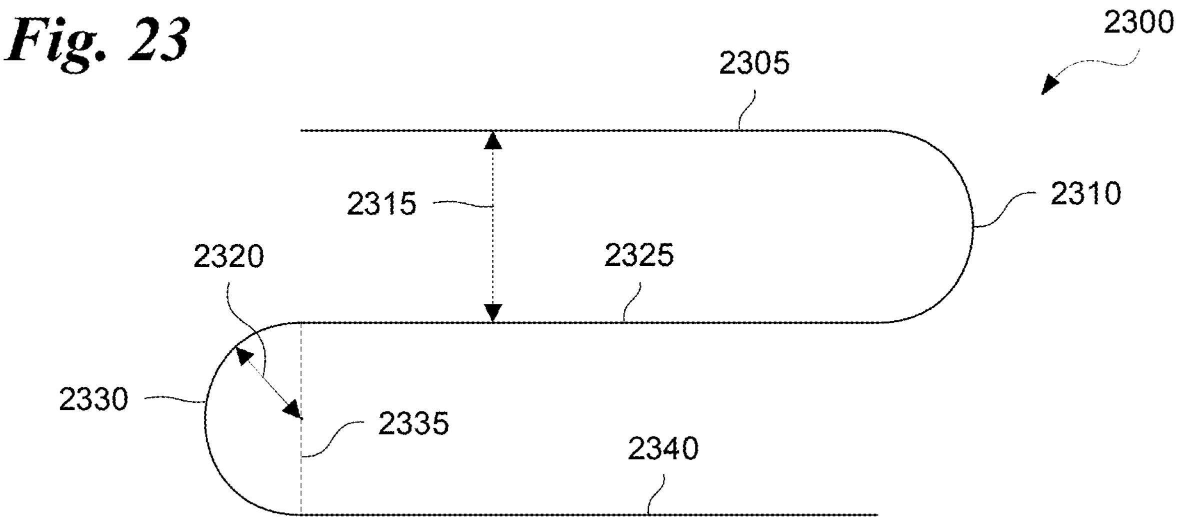
FIG. 23 illustrates one example of a pattern of traces like those illustrated in the preceding figures.
Figure 24:
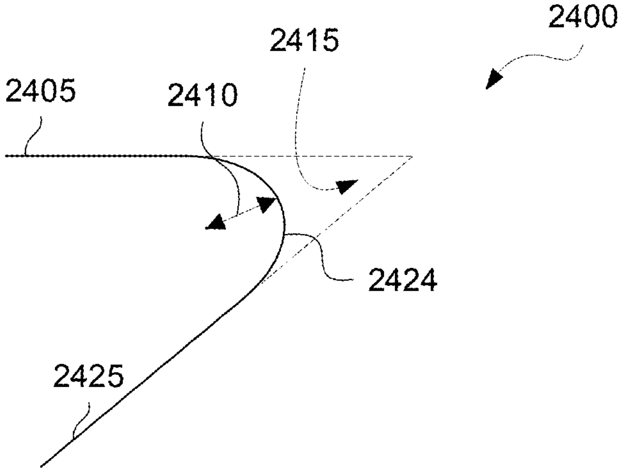
FIG. 24 illustrates another example of aspects of a pattern of traces like those illustrated in the preceding figures.

In another aspect, the constraints may include path constraints specific to the ink used and the posed pattern. These constraints may be specific to a proposed power distribution for a heating zone of the lens that is sufficient to heat the lens to a temperature high enough to reduce or eliminate moisture from the lens. In one aspect, path constraints may include a minimum trace-to-trace spacing necessary to establish a minimum required heating zone. An example of this constraint is illustrated in FIG. 23 at 2300. Traces 2305, 2325, and 2340 are electrically connected by turns 2310, and 2330. The combination of these may be also considered a single trace as well. The traces (or portions of a single trace) may be spaced apart by a distance 1915 which may be reduced to increase power density, or widened to improve other aspects such as light transmission. In another aspect, turns 2310 and 2330 may have a radius 2320 and diameter 2335 which may, or may not be, about equal to the spacing 2315. The traces may be positioned close together to define a heating zone which may be defined as a power distribution per square inch across the surface of the lens. The heating zone may be defined by the width of the traces, and the spacing between the traces, or portions of the traces. In another aspect, the minimum spacing of traces may be also defined by other aspects such as the mechanical dimensions of the applicator assembly, the viscosity of the ink, the resistive/conductive aspects of the ink, and the like. In one example, a minimum trace-to-trace spacing for dimension 2315 is less than 2 mm from the center of one trace to the center of an adjacent trace. In another example, dimension 2315 is less than 5 mm, less than 10 mm, less than 20 mm, or 20 mm or more.

In another aspect, path constraints may include a minimum turn angle for turns in a pattern of traces. One example of this aspect is illustrated at 2000 in FIG. 20. In one aspect, exceedingly sharp turns may cause ripples/waves in the trace while applicator assembly enters and exits a turn. In another aspect, the applicator had made reduced speed in traversing the turn which may cause excess material deposition and lead to cracking. For example, a trace 2405 may be electrically connected to a trace 2425 by turn 2420. As noted above, 2405, 2420, and 2425 may also be thought of as a single trace with separate portions separated by turns. A turn angle 2415 is illustrated and turn 2420 is shown with a radius of 2410. In one aspect, the system may impose a recommended minimum turn angle 2015 of 20 degrees or more, 45 degrees or more, 90 degrees or more, or other suitable minimum turn angle of less than 20 degrees. In another aspect, the system may impose a minimum turn radius of less than 5 mm, less than 10 mm, less than 20 mm, or 20 mm or more.

In another aspect, path constraints may include constraints on the contact pads which may be included to provide an electrical interface with terminals mounted in the headlamp assembly. A pad of higher thickness, such as greater than 0.2 mm (200 microns) may cause improper curing or bubbling and may result in reliability issues with respect to maintaining electrical contact with terminals in the lamp. In another aspect, the system accepts input defining the thickness and dimensions of the contact pad. In another aspect, the system automatically recommends a size and thickness depending on the compression forces exerted by the electrical terminals against the pad. In one example, a maximum pad area may be limited to less than 25 $mm^2$, less than 100 $mm^2$, less than 200 $mm^2$, or 200 $mm^2$ or more. In another aspect, the pad may have a thickness of less than 0.1 mm, less than 0.3 mm, less than 0.5 mm, or 0.5 mm or more.

In another aspect, the disclosed method may include adhering to height or width constraints for the disclosed traces. In one example, the nominal height may be less than 0.01 mm, less than 0.1 mm, less than 0.5 mm, or 0.5 mm or more. In another aspect, the nominal height for a trace may vary by about +0.1 mm. The disclosed system may accept user input defining the nominal height for traces using a user interface provided by the control circuit. In another aspect, trace height and/or width may be considered in determining a trace cross section. The system may be configured to accept input defining the cross-section for the traces. Some examples of trace cross-section are illustrated in FIG. 4, and elsewhere. The application process may define the cross-section according to multiple factors such as rate of ink deposition, ink viscosity, ink thixotropy, and Linear Mass Density (LMD) of the ink. In another aspect, the disclosed method includes adjusting the dimensions of the traces to obtain a target resistance of the resulting traces according to the LMD of the ink.

In another aspect, LMD may be a result of combination of nozzle speed and flow rate measurements which may be taken prior to the beginning of the application of the traces, or as the traces are applied. Flow rate may be understood as a rate of material deposition, in this case, the conductive ink. The system may be configured to accept input defining flow rate, ink deposited per unit length, and the like. In one example, the nominal flow rate may be less than 25 mg/sec, less than 100 mg/sec, or at least 100 mg/sec or more. In another aspect, the nominal flow rate may vary by about +35 mg/sec or about −10 mg/sec. In another aspect, the disclosed method includes programming the control circuit to control flow rates to optionally vary with the speed at which the applicator assembly moves. For example, the assembly may move at less than 50 mm/sec, less than 100 mm/sec, or at 100 mm/sec or more. These and other factors may determine the width and height of the trace according to the disclosed method. In one example, the nominal trace width is less than about 0.5 mm, less than 0.9 mm, less than about 2.1 mm, or 2.1 mm or more. In another aspect, trace widths may vary by about 0.65 mm larger to about 0.35 mm smaller than the nominal size.

In another aspect, the system is optionally configured to apply conductive ink as illustrated herein in a heating grid pattern that may include multiple parallel loops. A heating grid pattern may include two or more parallel loops, three or more parallel loops, or more loops as needed to provide sufficient power density to remove ice or other moisture from the lens. The disclosed process may account for multiple factors in determining the length or number of loops such as a target resistance, maximum linear resistance, ink exposure time, maximum print speed for the applicator assembly, time needed to unload a finished lens and load a new lens, the resistivity of the traces, the thickness of the traces, the nominal sheet resistivity of the ink, and the like. In one example, the target resistance for the overall trace pattern may be less than about 1 ohm, less than about 2 ohms, less than about 5 ohms, less than about 10 ohms, or 10 ohms or more.

In another aspect, the method may include determining the maximum linear resistance factor based on the maximum linear trace length and resistivity of the traces. This aspect may be performed automatic by control logic in the applicator assembly, or entered by a user using a user interface provided by the applicator assembly. In another aspect, the disclosed method may determine the maximum linear trace length according to factors such as ink exposure time, maximum speed of movement for the applicator assembly, and time required to load and unload parts. In considering ink exposure time, the disclosed method may account for ink exposure time which may be thought of as the time limit wet ink can be exposed to the ambient conditions without undergoing significant sheet resistivity aging prior to undergoing a curing process. In one example, the maximum exposure time allowed between starting of printing to loading in a curing oven is less than about five minutes, less than about eight minutes, less than about 15 minutes, or 15 minutes or more. Regarding the maximum speed of movement for the head, this may impose a limit accounted for by the disclosed method in determining the maximum trace length. In one example, the maximum speed of movement is less than about 20 mm/s, less than about 50 mm/s, less than about 70 mm/s, or 70 mm/s or more. With respect to time required unload a finished lens and load a new lens and restart the printing process, this may require less than about 75 seconds, less than about 90 seconds, less than about 120 seconds, or 120 seconds or more. With these factors in mind, a maximum linear trace length may be calculated for a given pattern of traces considering the limitations discussed herein. In one example, the maximum linear trace length is less than 3500 mm, less than 5250 mm, less than 8000 mm, or 8000 mm or more.

Another factor to considered by the disclosed method in determining maximum linear resistance is the resistivity of the trace material, which is the conductive ink applied by the disclosed method. This resistivity may depend on features of the trace such as the thickness of the trace (e.g. about 0.1 mm). This thickness may depend on other aspects of the ink deposited such as the thixotropic index of the ink. In one example, the thixotropic index is less than 1.5, less than 3.5, less than 5.5, or 5.5 or more. This index characterizes the extent of wettability on a given surface. Thus, as a result it partially controls the deposition cross-section area. The thickness may also depend on the viscosity of the ink deposited on the surface of the lens. In one example, the viscosity of the ink is less than 1500 centipoise, less than 2500 centipoise, less than 5000 centipoise, less than 10,000 centipoise, or is 10,000 centipoise or more. The viscosity of the ink while being dispensed may be controlled by the application assembly via certain machine settings, and this too may be an important factor in the resulting trace cross-section and overall heating performance of the resulting trace pattern.

In another aspect the overall resistivity of the traces may depend also on the sheet resistivity of the ink material. In one example, the nominal sheet resistivity of the ink is less than about 0.005 ohms/sq/mil, less than about 0.014 ohms/sq/mil, less than about 0.5 ohms/sq/mil, or 0.5 ohms/sq/mil or more.

Figure 25:
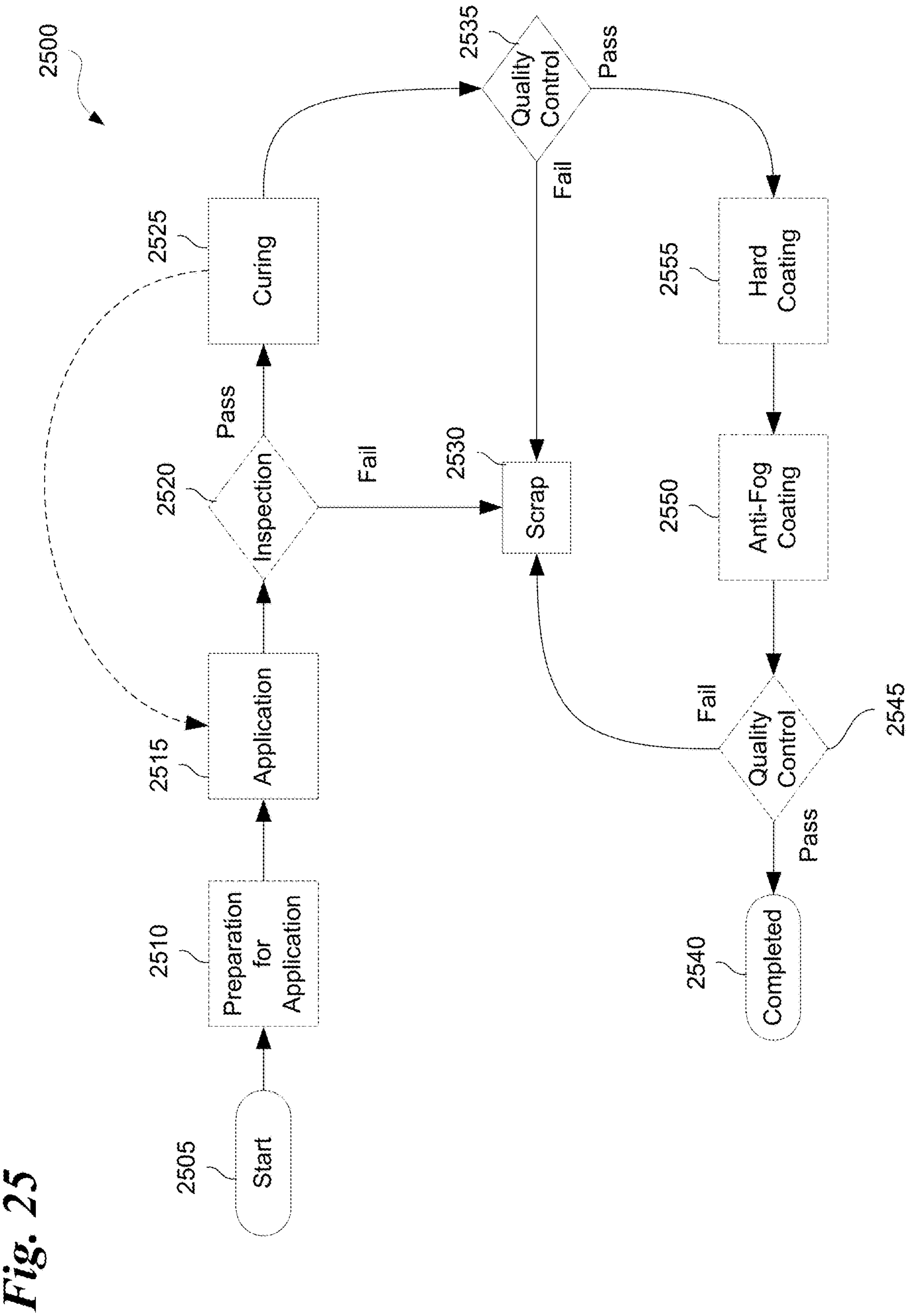
FIG. 25 is a flowchart illustrating aspects of a method of applying traces to a lens like those shown in the preceding figures.

One example of overall stages in the disclosed method is illustrated at 2500 in FIG. 25. The method begins at 2505 and optionally includes a stage where preparations for application of the conductive ink may be undertaken. Application of the conductive ink to the lens may take place at 2515, which is optionally followed by an initial inspection 2520. If the lens with the newly applied conductive ink fails, the lens may be scrapped at 2530. If the lens passes the initial inspection, the lens may be cured at 2525, such as by applying a heat source to the newly printed conductive ink. Another quality control process may optionally be performed at 2535, and the lens may be scrapped at 2530 if it fails this quality control inspection. If the lens passes, at 2535, a hard coating is optionally applied at 2555. An anti-fog coating may optionally be applied at 2550, and a final quality control inspection may be performed at stage 2545. If the lens passes the final quality control inspection at 2545, the process is complete and 2540. If the lens fails inspection at 2545, it may be scrapped at 2530.

Quality control at stages 2535 and 2545 may include any suitable aspects for determining whether the application of the conductive ink performed up to that point is sufficient. For example, quality control may include a visual inspection looking for bubbles, cracks, irregular trace width, irregular trace height, improper cross-sections, irregular spacing of traces, discontinuities in the traces, or other irregularities in the pattern of traces that may be determined visually. Quality control may also include testing whether the resistance of the resulting pattern of traces is within an acceptable range of resistance values. If the resistance of the overall pattern falls outside the range, the lens may be scrapped.

In another aspect, the thermal performance of the conductive ink may be inspected such as by applying power to the traces and measuring the power dissipation, temperature rise at the lens surface, and/or viewing the resulting energized pattern of traces using an infrared camera or other viewing device that is arranged and configured to visualize heat generated by the traces on the lens. In another aspect, quality control may include a microscopic view of the traces under magnification looking for irregularities that may not be visible without magnification. In another aspect, the optional inspection stage 2520 may include only a visual inspection as at this stage if the ink is uncured. In one example, uncured ink may be subject to improper sheet resistivity aging as a result of being exposed to ambient conditions for longer than a maximum threshold amount of time.

Along with aspects discussed above, the disclosed method of applying the ink may involve multiple aspects which are taken into consideration when applying the conductive ink in order to achieve a desirable result. For example, the control circuit may determine values for operational parameters useful in controlling the application process. These may include, but are not limited to parameters related to material rheology of the ink, material conductivity for the traces after curing, energy applied to each shot of ink, the frequency of each shot (or time between shots), the size of each shot of ink, the Linear Mass Density (LMD) of the ink, and the like.

The disclosed control circuit may be programmed and/or otherwise configured to account for any suitable combination of some or all of the parameters related to these aspects in achieving the desired result of applying conductive traces to a lens. These parameters may be useful throughout the stages shown in FIG. 25, such as in preparing for application at 2510, performing the application of the ink at 2515, or at inspection or quality control at 2520, 2535, or 2545, or during curing at 2525. The control circuits disclosed herein may include memory for storing the values associated with these operational parameters, and may optionally include a user interface configured to accept input defining the parameters based on user input. The parameter values may be input directly by a user, or automatically determined by sensors during the application process, or any combination of the two. In another aspect, the sensors may be electrically connected to the control circuit, or may be included as part of the overall control circuit, or both.

For example, the disclosed method may control the operation of the applicator assembly according to the spacing between placement of the traces, the surface energy of the lens material, the LMD of the conductive ink, and the rheology of the material. These aspects may include other parameters as discussed herein, and these aspects may be determined by calculations performed by the control circuit, or based on input obtained by the control circuit from a user interface accepting input from a user.

In another aspect, the application of the ink may be determined by aspects of the material rheology of the ink such as the temperature of the ink during dispensing, the storage and handling of the ink, the age of the ink, the binder to conductive filler ratio of the ink, the binder to solve ratio of the ink, the solvent to conductive filler ratio, or any combination of these. For example, the disclosed method may include using the control circuit to control the applicator assembly to increase or decrease the temperature of the ink during dispensing at 2515. In another aspect, the disclosed method may include determining the age of the ink, determining the binder to conductive filler ratio, determining the binder to solvent ratio, and/or the solvent to conductive filler ratio. Any one or more of these aspects may be obtained in any suitable manner such as by accepting user input via a user interface configured for this purpose.

Stage 2505 may include addressing or modifying other aspects related to the material rheology. These may include preparing the ink, or verifying it is properly prepared to achieve the desired trace properties with the proper resulting energy distribution. In one aspect, preparing the ink may include obtaining conductive ink for use in the application of the disclosed conductive traces. In another aspect, the ink may be prepared with a viscosity of less than 3000 centipose (cps), less than 10,000 cps, less than 25,000 cps, or 25,000 cps or more. This may include a variation in viscosity by less than +/−2500 cps @ 0.1 secs, less than +/−5000 cps @ 0.1 secs, or +/−5000 cps or more @ 0.1 secs. In another example, the viscosity may vary by less than +/−500 cps @ 0.01 secs, less than +/−1500 cps @ 0.01 secs, or 1500 cps or more @ 0.01 secs. In another aspect, the ink may be optionally prepared with a sheet resistivity of less than 0.005 ohm/square/mil, less than 0.05 ohm/square/mil, less than about 0.1 ohm/square/mil, or 0.1 ohm/square/mil or more. In another aspect, the ink may be prepared with a binder to solvent ratio of less than about 3 pph, less than about 6 pph, less than 10 pph, or 10 pph or more. This binder to solvent ratio may vary by less than +/−0.01 pph, less than +/−0.03 pph, less than +/−0.09 pph, or +/−0.09 pph or more. In another aspect, the ink may be prepared with a silver loading of less than about 15%, less than about 35%, less than about 80%, or 80% or more. The silver loading may vary by less than +/−0.5%, less than +/−0.75%, less than +/−1.85%, or +/−1.85% or more. In another aspect, the ink may be prepared by maintaining the ink at less than 2 degrees C., less than 5 degrees C., less than 8 degrees C., or 8 degrees C. or more during transportation and storage.

In another aspect, the ink preparation may include measuring the viscosity of the ink such as by sampling the ink and measuring the viscosity prior to application. In another aspect, the ink preparation may include measuring the sheet resistivity of the ink by sampling the ink prior to application according to the disclosed method. In another aspect, the ink preparation may include measuring the ink into predetermined portions, such as by loading about 30 cubic centimeters of ink into a dispensing device. The dispensing device may be any suitable container such as a syringe. In another aspect, the ink preparation may include agitating the ink for a predetermined period of time. In one example, the ink may be agitated for less than 10 secs, less than 15 secs, less than 30 secs, or 30 secs or more using a syringe agitator, or any other suitable agitating device. In another aspect, the ink preparation may include assembling the ink container with the ink nozzle. In another aspect, preparing the application may include purging air bubbles from the nozzle assembly. In another aspect, purging may include manually passing less than about 1 gram of ink, or less than about 1.5 grams of ink, or 1.5 grams of ink or more through the nozzle. In another aspect, prepared the ink may include maintaining the ink at between about 3 degrees C. and about 5 degrees C. until it is loaded into the applicator assembly.

Preparing the system for application of the conductive ink at 2510 may also include other aspects such as automatically or manually adjusting operational parameter values so that the control circuit may control the applicator assembly to properly apply the ink. Any suitable values may be used for these operational parameters, some examples of which are included herein.

In another aspect, the application of the ink may be determined at least in part by the material conductivity of the traces upon curing. The disclosed method may include using the control circuit to determine or control (or both) a suitable material conductivity for the resulting cured traces. In one aspect, the method may include automatically determining or accepting input defining the rheology of the ink material, the curing temperature, the curing time, properties of the ink, the surface energy of the lens surface, the LMD, or any combination thereof. Properties of the ink that may be automatically determined or obtained as input by the control circuit include the material vapor pressure of the ink, the conductive filler loading of the ink, the particle size distribution, the particle orientation when cured, the adhesion property with the lens surface, the material elongation properties of the cured trace, or any combination thereof.

Any one or more of these operational parameters related to the material conductivity of the cured ink may be determined automatically by the control circuit or obtained in any suitable manner such as by accepting user input via a user interface configured for this purpose. These parameters may be determined in advance at 2510, determined after application and curing at 2535 or later, and/or used in the application of the trace at 2515.

In another aspect, the application of the ink may be determined at least in part by the energy applied to each shot of ink, the frequency of each shot (or time between shots), the size of each shot of ink, or any combination thereof. In another aspect, the disclosed method may include using the control circuit to determine a suitable shot energy. This may involve using the control circuit to control a plunger of the applicator assembly. The method may thus include using the control circuit to control aspects of the plunger such as the plunger force, the plunger velocity, the plunger length, the plunger diameter, or any suitable combination thereof.

In another aspect, determining the required energy to apply to each shot of ink may include determining aspects of the material rheology of the ink as discussed herein elsewhere. In another aspect, determining the energy to apply to the ink may include determining the proper orifice for the applicator assembly, and optionally, the finish of the orifice.

In another aspect, the disclosed method may include using the control circuit to determine and/or control the shot frequency based on the plunger frequency, and the maximum travel speed for the applicator assembly. In another aspect, the method may include using the control circuit to determine and/or control the shot size based on the energy to be applied to the ink, and/or the shot frequency.

Any one or more of these operational parameters used to determine the energy applied to the ink, the frequency of each shot of ink, and the size of each shot, may be determined automatically by the control circuit or obtained in any suitable manner such as by accepting user input via a user interface configured for this purpose. These parameters may be determined in advance at 2510 and/or used in the application of the trace at 2515.

In another aspect, the application of the ink may be determined at least in part by the Linear Mass Density (LMD) of the conductive ink as discussed herein. For example, the disclosed method may include using the control circuit to determine a suitable LMD, or to calculate a resulting LMD based on other operational parameters such as the shot frequency, the shot size of the ink, the conductivity of the cured traces, or any combination thereof. For example, the control circuit may accept input defining the desired material conductivity, and from this determine a shot frequency and/or shot size for the ink. In another example, the control circuit may accept input defining the shot size and shot frequency, and from these automatically determine the conductivity of the material when cured.

In another aspect, the applicator assembly may include a cycle setting, one example of which is about 4 ms. In another aspect, the applicator assembly may include an air pressure setting, one example of which is about 40 PSI. These may be controlled by the control circuit, or determined automatically according to other operational parameters, user input, or any combination thereof.

Figure 26:
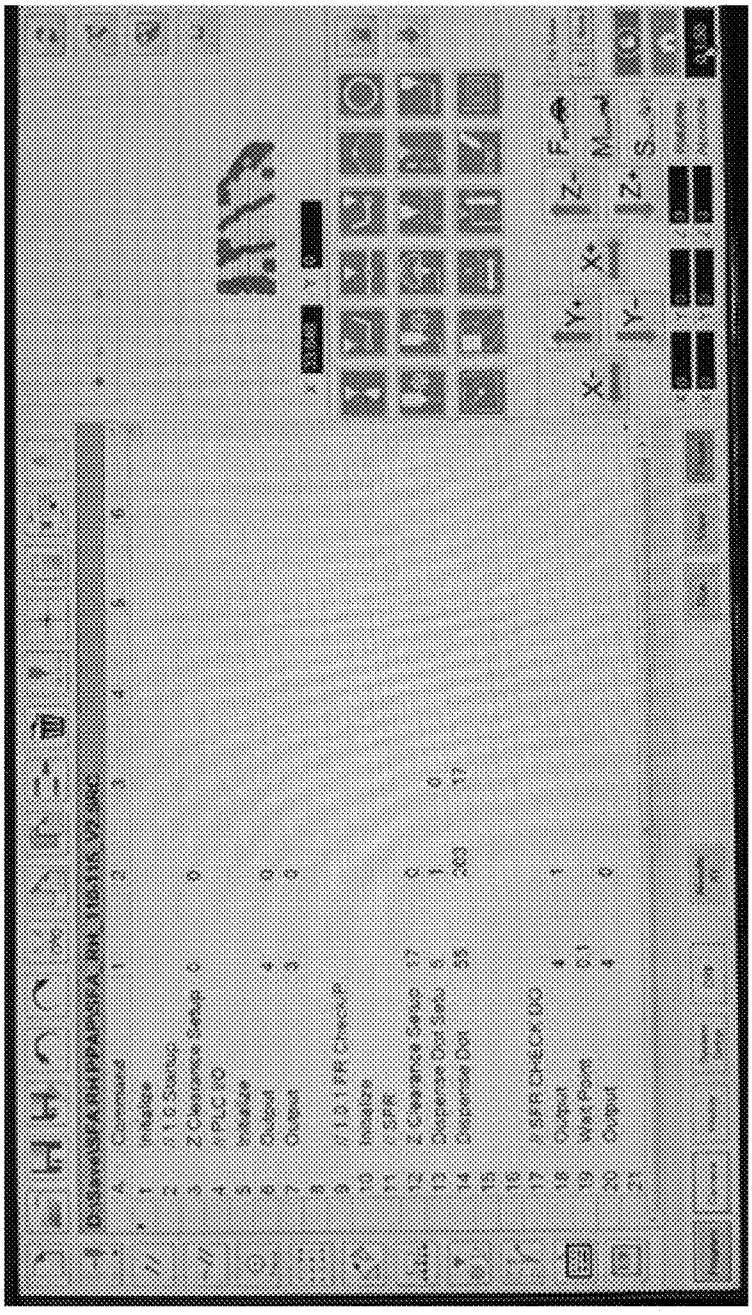
FIG. 26 illustrates one example of user interface that may be provided according to the disclosed method of applying conductive traces.
Figure 27:
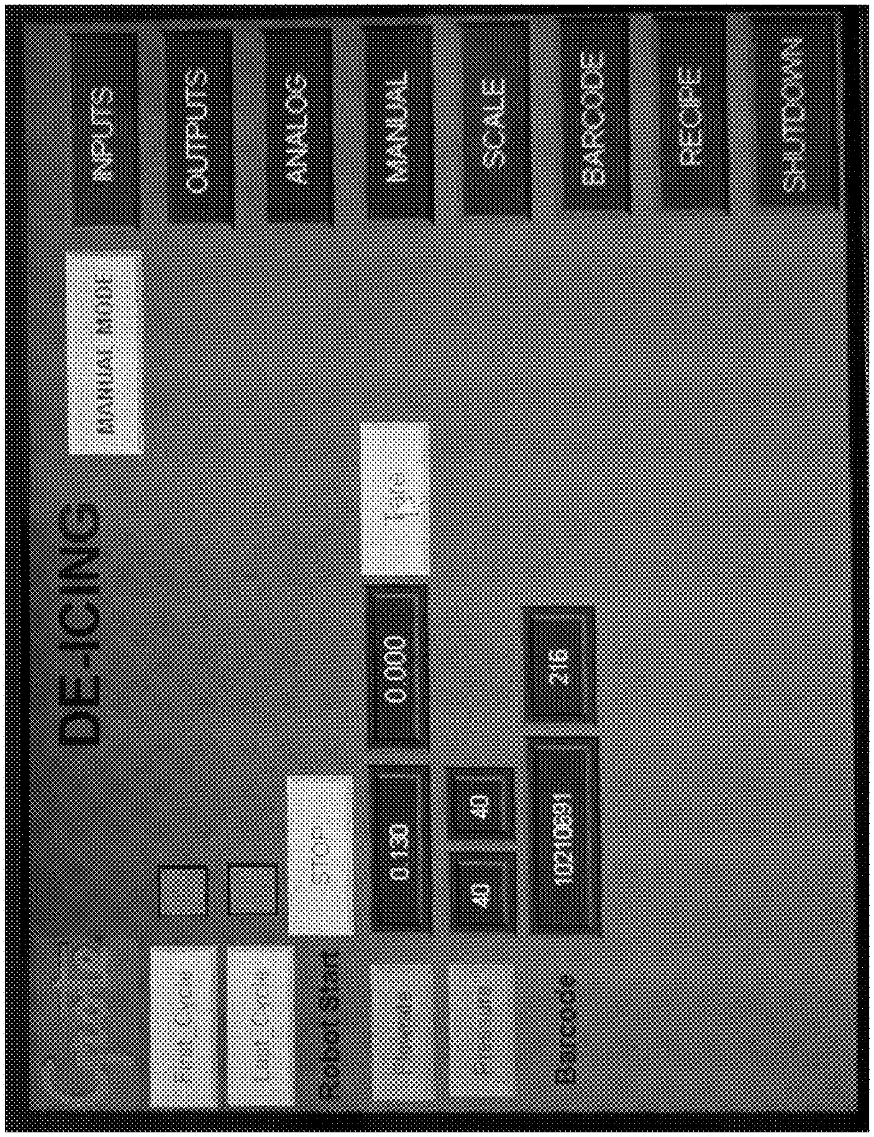
FIG. 27 illustrates another example of user interface like the user interface of FIG. 26.

In another aspect, the disclosed method may include increasing the air pressure value as the cycle value is increased. This may be performed automatically or manually. For example, the disclosed applicator assembly may include control logic such as may be found in control circuit 1160. The control logic and/or control circuit 1160 may be configured to provide a user interface such as user interface 1165, one example of which is shown in FIG. 26 at 2200, and another example of which is shown at 2700 in FIG. 27. The control logic may be programmed or otherwise configured to increase the air pressure value as the cycle value is increased. This increase may occur automatically or as a result of user input obtained by the user interface. The user interface may be optionally configured to accept input activating or deactivating automatic pressure control relative to the cycle value, or the user interface may be optionally configured to accept input for manually adjusting the pressure control relative to the cycle value based on user input.

In another aspect, the disclosed method may include adjusting the LMD as needed to manage the resistance of the resulting traces. The control logic may be programmed or otherwise configured to automatically adjust flow rate setting as needed to manage the resistance of the traces. In another aspect, the user interface may include options for activating or deactivating automatic flow rate control, or may provide user interface controls that are optionally configured to accept input for manually adjusting the flow rate control.

In another aspect, the disclosed method may include compensating for shifts in material sheet resistivity of the traces. In one aspect, the control logic may be programmed or otherwise configured to automatically compensate for shifts in material sheet resistivity of the traces. The disclosed user interface may be configured to accept input activating or deactivating automatic compensation for shifts in sheet resistivity. The user interface may optionally provide user interface controls for manually providing values useful for adjusting for shifts in material sheet resistivity. In another aspect, the control logic may be configured to automatically maintain the resistance of the resulting traces to be within about 0.375 standard deviations of a target resistivity. The user interface may provide controls for accepting input activating and deactivating this automated control.

In another aspect, the disclosed method optionally includes adjusting dispensing parameters like cycle and pressure based on sheet resistivity and flow rate for each individual batch of ink. In one aspect, the control logic may be programmed or otherwise configured to automatically adjust dispensing parameters like these specific to a given batch of ink to achieve the desired resistivity for the conductive traces. The disclosed user interface may be configured to accept input activating or deactivating automatic control for these dispensing parameters, or optionally, user interface controls for manually adjusting the dispensing parameters as needed to account for specific resistivity and flow rate for a given batch of ink.

In another aspect, the disclosed method optionally includes preparing a lens for application of the disclosed conductive ink. Such preparation may be performed automatically or manually. In one example, preparing a lens for application of the ink includes reducing or eliminating static electricity from surface of the lens where the ink is to be applied. Examples include, but are not limited to plasma treatment of the lens surface, carbon dioxide cleaning, physical wiping, deionizing, or any suitable combination of these. One example of reducing static electricity is to optionally engage a deionizing blower directed toward the lens for less than about 15 seconds, less than about 30 secs, or 30 seconds or more. In another aspect, preparing a lens for application of the disclosed traces may include obtaining a lens made primarily of a polycarbonate material. In another aspect, preparing a lens for application of the disclosed traces may include obtaining a lens with a maximum lens geometrical volume of about 30 inches by about 9 inches by about 8.65 inches.

Other aspects of preparing for application of the ink at 2510 may include configuring or programming the control logic in the applicator assembly to perform the application process automatically. A user interface such as user interface 1165 may be provided by the applicator assembly for the purpose of providing one or more user interface controls configured to capture user input defining various aspects of the application procedure the system will automatically follow in applying the conductive ink. In one aspect, the method optionally includes preparing a dispensing path according to desired aesthetic and heating grid constraints. This may include optionally using the user interface to input a dispensing path into the control circuit, and optionally confirming the path.

In another aspect, the method optionally includes programming changes to the printing head speed and acceleration which may vary according to the dispensing path and other constraints as disclosed herein elsewhere. In another aspect, the method optionally includes defining the ink deposition rate in grams/mm. In another aspect, the method may include configuring printing head speed and acceleration to optionally control width and thickness of the traces. In another aspect, the method may include configuring the dispensing height of the nozzle or other aspects of the applicator assembly.

In another aspect, the method may include programming the control logic to adjust for increased dispensing height to optionally achieve increased radial dispersion of the ink. In one example, the dispensing height may be programmed to 7 mm or less, to 13 mm or less, or to a dispensing height that is 13 mm or more. In another aspect, the method may include configuring the dispensing height to adjust automatically depending on the location of the print head on the dispensing path. In another aspect, the method may include configuring the control logic to automatically move the dispensing head across the surface of the lens to apply the ink. In another aspect, the disclosed method may include programming the dispensing head to independently rotate as needed on up to three separate and distinct rotational axes. This rotational aspect may be included so as to maintain the nozzle and/or the resulting stream of ink emanating therefrom substantially perpendicular relative to the surface of the lens. In another aspect, the method may include optionally programming the control logic to independently move the nozzle on up to three separate and distinct axes of movement so as to maintain the nozzle at a predetermined target distance from the surface of the lens. In another aspect, the method may include programming the control logic with the dispensing path configured to automatically change the position of the head relative to the surface of the lens. In another aspect, the method may include programming the control logic with a dispensing path that is configured to include changes in orientation of the head relative to contours of the lens. The disclosed user interface may be configured to provide user interface controls for capturing user input defining any of the above mentioned aspects so that they may be incorporated into the application process as discussed herein elsewhere.

In another aspect preparing for the application of conductive ink may include configuring the control logic with information about the applicator assembly. The user interface may include controls for accepting values defining the different aspects of the applicator assembly. For example, preparing for the application procedure may include programming the control logic with the distance from the nozzle to the front edge of the nozzle (dimension 1305 in FIG. 13). In another aspect, the application procedure may include programming the control logic with the distance from the nozzle to the back edge of the nozzle (dimension 1315 in FIG. 13). These and possibly other dimensions may be used by the control circuit to determine how close the applicator assembly may come to a given portion of the lens without touching it.

These structural aspects of the nozzle and the applicator assembly may be configured by any suitable means, such as by user input accepted via the user interface 1165, or as data provided automatically to the applicator assembly. This information may be determined automatically in one example by data about the nozzle encoded in or on the nozzle itself that is automatically obtained by the control logic when the nozzle is coupled to the applicator assembly. Thus the method may include obtaining structural limitation information from the nozzle or other portions of the applicator assembly.

In another aspect preparing for the application of conductive ink may include configuring the control logic with information about the traces. This information may be used to define the path to be followed by the applicator assembly. In one aspect, the disclosed method of applying traces may include establishing an acceptable power distribution for the lens surface by adjusting trace spacing and/or trace width. In one example, traces are spaced at least 4 mm apart or more. In another aspect, the method may include establishing a minimum turn angle to reduce or eliminate irregular or excessive deposition of ink which may cause waves, ripples, or other irreglarities in the traces. In one example, the minimum turn angle is at least 40 degrees or more. In another aspect, the method may include establishing a minimum turn radius to reduce or eliminate irregular traces. In one example, the minimum turn radius is at least 2 mm or more.

In another aspect, the method may include establishing a suitable pad geometry for contacts pads configured to electrically connect to a power connector. In one example, the pad geometry is rectangular and/or less than 10 mm×10 mm. In another example, the pad geometry is 0.2 mm or less in thickness.

In another aspect, the method optionally includes determining maximum, minimum and/or nominal trace height values for the traces. In another aspect, the method may include establishing a variable trace height which may vary according to trace width and the location on the lens. In one example, the nominal trace height is about 0.1 mm or 100 microns. In another example, the nominal trace height varies between about 200 microns and 80 microns. In another example, the trace height may be higher or lower according to trace cross section.

In another aspect, the method may include determining a trace width for the traces. In one example, establishing the trace width may involve establishing a variable trace width which may vary according to trace height and location on the lens. In another example, the trace width may be determined according to ink viscosity, ink thixotropy, and the amount of ink to deposit per unit length (LMD). In another aspect, the method may involve adjusting the deposit per unit length according to flow rate and travel speed of the applicator assembly. In one example, the nominal flow rate is 25 mg/sec at 50 mm/sec print head speed. In another example, the nominal flow rate varies from 15 mg/sec to 70 mg/sec at 50 mm/sec print head speed. In another example, the nominal trace width is about 0.85 mm or 850 microns. In another example, the nominal trace width varies between about 0.5 mm and about 1.5 mm or about 500 to about 1500 microns. These operational parameters about the traces may be automatically determined by the control circuit, or accepted as input from the user using the user interface provided by the applicator assembly, or any combination thereof.

In another aspect, the method may include preparing a heating grid pattern to control the position, spacing, and alignment of the resulting traces on the lens. In one aspect, the method optionally includes determining a heating grid that includes multiple parallel loops, such as the pattern shown in FIG. 15. The method may include preparing the pattern of traces based on a two-dimensional or three-dimensional representation of the lens surface and accepting as input this representation of the lens. For example, the representation of the lens surface may be uploaded to the control circuit from a remote computing device using a communications link between the remote computing device and the control circuit.

In one example, the heating grid includes at least 3 parallel loops. In another aspect, the method may include modifying the loop design to account for a maximum linear resistance of the ink. In another aspect, the method may include modifying the trace length to accommodate maximum linear resistance of the ink. In another aspect, the method may include modifying the linear trace length to account for the maximum time the ink may be exposed to ambient temperatures during printing. In one example, the maximum linear trace length is about 5250 mm or less. In another example, the maximum ink exposure time to ambient conditions is about 8 minutes or less. In another aspect, the method may include modifying the loop design in the heating grid pattern to account for maximum head speed of the nozzle. In one example, the maximum printing head speed is between about 20 mm/sec and about 70 mm/sec. In another aspect, the method may include modifying the resistivity of the ink maintained by the control logic to accommodate the maximum linear resistance of the ink. In another aspect, the method may include modifying the thickness of trace to accommodate the resistivity of the ink. In another aspect, the method may include modifying the thickness of the trace to accommodate a thixotropic index of the ink. In another aspect, the method may include modifying the thickness of a trace to accommodate the shear viscosity of the ink. In another aspect, the method may include modifying the thickness of the trace or traces to accommodate nominal sheet resistivity of the ink. These operational parameters associated with preparing the heating grid pattern may be automatically determined by the control circuit, or accepted as input from the user using the user interface provided by the applicator assembly, or any combination thereof.

The application of the traces to the lens surface at 2515 may include any suitable aspects, examples of which are included herein. In one aspect, applying the traces to the lens surface may include monitoring the flow rate of ink applied by the nozzle during dispensing. In another aspect, the method may include adjusting the dispensing parameters in real time according to flow rate of the ink to achieve a target sheet resistivity, a value which may be predetermined ahead of the application process, or may be determined in real time by the control circuit as the application process proceeds.

In another aspect, the application of the traces may include changing and cleaning nozzles. In one example, changing and/or cleaning is performed after 10 lenses are printed, although it may be performed more or less often as needed. In one example, the dispensing nozzle may be automatically cleaned using an ultrasonic cleaning device. In another example, the dispensing nozzle may be cleaned by the application of manual scrubbing and/or cleansing agents. In another example, the nozzle is optionally cleaned during a pause in operation of the applicator assembly. In another example, the dispensing nozzle is optionally cleaned using a tip cleaner. In another example, the nozzle is optionally cleaned after completion of each lens. In another example, the dispensing nozzle may be cleaned using a tip cleaner that has an IPA micro feeding solenoid.

As disclosed throughout, the disclosed method of applying traces to a lens at 2515 may include application of the traces by noncontact dispensing of conductive ink via an ink jet dispensing head which may include one or more separate orifices. In another aspect, the disclosed method may include dispensing ink at less than 3 mm from surface of the lens, or at less than 13 mm from surface of the lens, or at less than 7 mm from surface of the lens. In one example, the method optionally includes dispensing ink between about 5 to 7 mm and about 10-13 mm for about 20 to 30 mm of trace length or less. In another aspect, the disclosed method includes dispensing ink at distances from the lens surface that are sufficient to overcome obstacles projecting from the lens surface such as tabs, flanges, snaps, etc. In another aspect, the method optionally includes capturing images of the printing process with camera. In one example, the camera is optionally mounted adjacent to the printing head. In another example, the camera is optionally mounted on the printing head and moves with the print head. As disclosed elsewhere, the control of the print head may be performed automatically according to the disclosed criteria and limitations stored in the control circuit. The nozzle and other aspects of the applicator assembly receive input from the control circuit which specify the changes to the position, orientation, flow rate, duty cycle etc. to achieve the desired result of applying a pattern of traces to a lens.

In another aspect, the disclosed traces, and method for applying them to a lens surface, may involve making multiple passes by the applicator assembly to achieve the desired trace properties. For example, applicator assembly and nozzle may be controlled by the control circuit to apply a first application of ink to the lens in a predetermined trace pattern, and then to apply a second application of ink to the lens. The second application of ink may be applied directly over the first application of ink according to the same predetermined trace pattern. In another aspect, the ink may undergo a curing process at 2525 between the application of the first and second layers of ink. In another aspect, the disclosed method may include multiple applications of ink, thus allowing the ink to be optionally applied according to the predetermined pattern of traces in two passes, three passes, four passes, or more. In another aspect, multiple layers may be applied to portions of the pattern of traces as needed, leaving other portions with only a single layer of ink, or with a lesser or greater number of applications of ink. In one example, the combined thickness of the multiple layers of ink is less than 0.4 mm, less than 0.9 mm, less than 1.2 mm, or 1.2 mm or more. In another aspect, multiple layers of ink may be applied to the lens surface according to a predetermined pattern of traces absent a curing process between applications of the multiple layers. In this example, multiple layers may be applied "wet" to the surface of the lens and optionally cured after all layers are applied.

The curing of the traces to the lens surface at 2525 may include any suitable aspects, examples of which are included herein. In one aspect, the method includes heating the lens with newly applied traces to a target temperature and holding that temperature for a specific period of time. In one example, the lens and the traces may be heated to 120 degrees C. for 120 min to cure the traces. In another example, the lenses may be cured by optionally automatically controlling the temperature of the curing oven to less than about 90 degrees C., less than about 130 degrees C., or less than about 155 degrees C. for less than about 90 minutes, less than about 125 minutes, or 125 minutes or more. In another example, the lens may be cured in a forced convection oven. In another aspect, newly printed lenses may be moved from the printing area to a curing oven before a predetermined exposure time limit expires. In one example, the exposure time limit may be less than 180 secs, less than 360 secs, less than 720 secs, or 720 secs or more.

In considering the quality control aspects of the disclosed method, a full quality control examination may be performed one or more times during the disclosed method, such as at 2535, and/or 2545. In one aspect, the method may include a visual inspection of the resulting traces for defects. In another aspect, the method may include testing the traces to determine if the traces fall within a target range of resistance values. In one example, the resistance of the traces may be automatically measured using a properly calibrated multimeter. In one example, the resistance of the trace pattern may be less than about 1 ohm, less than about 2 ohms, less than about 5 ohms, less than about 10 ohms, or 10 ohms or more. Any suitable conductivity/resistivity may be used to achieve the desired power transfer and resulting thermal output.

In another aspect, the method optionally includes testing the thermal properties of the traces by applying power to the traces and measuring the resulting heat output of the pattern. This may include measuring a temperature rise at the surface of the lens using a thermometer or other temperature sensing device. In another example, the method may include using a thermal imaging device to visually review the resulting heating pattern for defects. In one example, this may include comparing the thermal heating output from the traces to the original dispensing pattern. In another example, this may include comparing the thermal heating output to the dispensing pattern looking for irregularities in temperature and discontinuity in traces.

In another aspect, quality control in the disclosed method may include determining the current drawn by the traces. In one example, the current draw is less than about 1.2 A, less than about 3.5 A, less than about 5.2 A, or 5.2 A or more. In another aspect, quality control may include measuring the voltage drop across the traces. In one example, this voltage drop is less than about 8 V, less than about 13 V, less than about 24 V, or 24 V or more.

In another aspect, the disclosed method may include applying an anti-fog coating at 2550, and an optional hardening coating at 2555. The anti-fog and hardening coatings may be applied to either the inside or outside surface of the lens, or to both. Thus either coating, or both coatings, may be applied over the traces, preferably after they are cured. Quality control and performance testing may be optionally repeated at 2545 before the disclosed method is complete at 2540.

Other examples of the disclosed concepts include the following numbered examples:

Example 1: A lamp assembly for a vehicle, comprising a lamp positioned in a housing;

a light transmissive lens coupled to the housing in front of the lamp, the light transmissive lens defining a curved cross-section with a curvature extending across the lens; and one or more electrically conductive traces positioned on a surface of the lens, the electrically conductive traces extending across and curving with the curvature of the light transmissive lens.

Example 2: The lamp assembly of any preceding example, comprising a first coating covering the one or more electrically conductive traces Example 3: The lamp assembly of any preceding example, wherein the first coating covers a portion of the lens surface leaving a separate second portion uncovered.

Example 4: The lamp assembly of any preceding example, wherein the electrically conductive traces extend outwardly away from the surface of the lens and have a thickness of at least 0.03 mm.

Example 5: The lamp assembly of any preceding example, wherein the electrically conductive traces are positioned on an inside surface of the lens.

Example 6: The lamp assembly of any preceding example, wherein the electrically conductive traces are positioned on an outside surface of the lens.

Example 7: The lamp assembly of any preceding example, wherein the electrically conductive traces have a cross-section that is taller than it is wide.

Example 8: The lamp assembly of any preceding example, wherein the electrically conductive traces have a cross-section that is about as tall as it is wide.

Example 9: The lamp assembly of any preceding example, wherein the electrically conductive traces have a cross-section that is wider than it is tall.

Example 10: The lamp assembly of any preceding example, wherein the electrically conductive traces have a cross-section that defines a half circle, or a half oval.

Example 11: The lamp assembly of any preceding example, wherein the curvature of the light transmissive lens defines a concave interior surface, and wherein the electrically conductive traces are positioned on the concave interior surface of the lens.

Example 12: The lamp assembly of any preceding example, wherein the curvature of the light transmissive lens defines a convex exterior surface, and wherein the electrically conductive traces are positioned on the convex exterior surface of the lens.

Example 13: The lamp assembly of any preceding example, wherein the curvature of the light transmissive lens defines a substantially planar inner or outer surface, and wherein the electrically conductive traces are positioned on the planar surface of the lens.

Example 14: The lamp assembly of any preceding example, wherein the electrically conductive traces are primarily made of conductive silver ink.

Example 15: The lamp assembly of any preceding example, wherein the electrically conductive traces are substantially opaque.

Example 16: The lamp assembly of any preceding example, wherein the electrically conductive traces are substantially opaque.

Example 17: The lamp assembly of any preceding example, wherein the ink is translucent, substantially transparent, and/or light transmissive.

Example 18: The lamp assembly of any preceding example, comprising a second coating covering a first coating and the one or more electrically conductive traces.

Example 19: The lamp assembly of any preceding example, wherein a second coating has a different chemical composition than a first coating, and wherein the first or second coating, or both, include an anti-fog compound.

Example 20: The lamp assembly of any preceding example, wherein the light transmissive lens defines a surface area that is at least 65 square inches.

Example 21: The lamp assembly of any preceding example, wherein the light transmissive lens is substantially round, and wherein the curved cross-section defines an arc extending outwardly from a center of the lens.

Example 22: The lamp assembly of any preceding example, wherein the light transmissive lens is about 4 to 4½ inches in diameter.

Example 23: The lamp assembly of any preceding example, wherein the lens defines an L-shaped cross-section and a corresponding corner region, the electrically conductive traces extending across the corner region.

Example 23: The lamp assembly of any preceding example, comprising at least two electrically conductive terminals on the surface of the light transmissive lens, wherein the at least two electrically conductive terminals are electrically connected to the conductive traces; and wherein one of the electrically conductive terminals is configured to receive power from a vehicle power source.

Example 24: The lamp assembly of any preceding example, wherein the lamp includes at least one light emitting diode.

Example 25: The lamp assembly of any preceding example, wherein the lens is a headlight lens for a vehicle.

Example 26: The lamp assembly of any preceding example, wherein the electrically conductive traces have a resistance of less than 500 ohms.

The concepts illustrated and disclosed herein related to a lens assembly may be configured according to any of the following non-limiting numbered examples:

Example 1: A lens assembly for a vehicle lamp that includes a light transmissive lens that defines a curved cross-section with a curvature extending across a length or a width of the lens, and one or more electrically conductive traces on an inside surface of the lens, the electrically conductive traces extending across the curvature of the light transmissive lens.

Example 2: The lens assembly of any preceding example, wherein the curved cross-section defines a concave inside surface of the lens.

Example 3: The lens assembly of any preceding example, wherein the electrically conductive traces have a thickness of at least 0.03 mm.

Example 4: The lens assembly of any preceding example, wherein the electrically conductive traces are primarily made of conductive silver ink.

Example 5: The lens assembly of any preceding example, comprising a first coating covering at least a portion of the one or more electrically conductive traces and a portion of the lens adjacent, wherein a separate second portion of the lens is free of the first coating.

Example 6: The lens assembly of any preceding example, wherein the electrically conductive traces extend outwardly away from the surface of the lens and have a thickness of at least 0.03 mm.

Example 7: The lens assembly of any preceding example, wherein the electrically conductive traces are positioned on an inside surface of the lens.

Example 8: The lens assembly of any preceding example, wherein the electrically conductive traces are positioned on an outside surface of the lens.

Example 9: The lens assembly of any preceding example, wherein the electrically conductive traces have a cross-section that is taller than it is wide.

Example 10: The lens assembly of any preceding example, wherein the electrically conductive traces have a cross-section that is about as tall as it is wide.

Example 11: The lens assembly of any preceding example, wherein the electrically conductive traces have a cross-section that is wider than it is tall.

Example 12: The lens assembly of any preceding example, wherein the electrically conductive traces have a cross-section that defines a half circle, or a half oval.

Example 13: The lens assembly of any preceding example, comprising a second coating covering a first coating and the one or more electrically conductive traces, wherein the second coating has a different chemical composition than the first coating, and wherein the second coating includes an anti-fog compound.

Example 14: The lens assembly of any preceding example, wherein the light transmissive lens defines a curved surface area that is at least 65 square inches in area.

Example 15: The lens assembly of any preceding example, wherein the light transmissive lens is substantially round and about 4 to 4½ inches in diameter.

Example 16: The lens assembly of any preceding example, comprising a housing coupled to the lens, a lamp positioned in the housing adjacent a concave inside surface of the lens, and a sealing member between the housing and the lens configured to partially or hermetically seal the housing to the lens with the lamp inside the housing.

Example 17: The lens assembly of any preceding example, wherein the lamp includes at least one light emitting diode.

Example 18: The lens assembly of any preceding example, wherein the lens is a headlight lens for a vehicle.

Example 19: The lens assembly of any preceding example, wherein the electrically conductive traces have a resistance of less than 500 ohms.

The concepts illustrated and disclosed herein related to a method of applying a conductive trace to a lens may include any of the following non-limiting numbered examples:

Example 1: A method that includes applying conductive traces to a lens using an applicator assembly, wherein the applicator assembly applies the conductive traces without contacting the lens.

Example 2: The method of any preceding example, including preparing the applicator assembly to apply the conductive traces.

Example 3: The method of any preceding example, comprising programming or configuring a control circuit of the applicator assembly with a pattern for the conductive traces.

Example 4: The method of any preceding example, comprising apply the conductive ink to the surface of the lens using the control circuit operating according to a pattern for the conductive traces.

Example 5: The method of any preceding example, comprising curing the ink to the lamp lens.

Example 6: The method of any preceding example, comprising inspecting the traces and/or the lens for defects.

Example 7: The method of any preceding example, comprising applying an additional coating over the conductive traces.

Example 8: The method of any preceding example, comprising controlling the applicator assembly to apply ink according to the material rheology.

Example 9: The method of any preceding example, comprising controlling the applicator assembly to apply ink according to the material conductivity of the conductive ink.

Example 10: The method of any preceding example, comprising controlling the applicator assembly to apply ink according to the energy applied to an individual shot of ink applied by the applicator assembly.

Example 11: The method of any preceding example, comprising controlling the applicator assembly to apply ink according to the frequency at which shots of ink are applied by the applicator assembly.

Example 12: The method of any preceding example, comprising controlling the applicator assembly to apply ink according to the size of the shots of ink applied by the applicator assembly.

Example 13: The method of any preceding example, comprising controlling the applicator assembly to apply ink according to the Linear Mass Density (LMD) of the ink applied by the applicator assembly.

Example 14: The method of any preceding example, comprising controlling the applicator assembly to apply ink according to the material temperature during dispensing of the ink.

Example 15: The method of any preceding example, comprising controlling the applicator assembly to apply ink according to the material temperature during dispensing of the ink.

Example 16: The method of any preceding example, comprising controlling the applicator assembly to apply ink according to the storage and handling of the ink prior to application of the ink.

Example 17: The method of any preceding example, comprising controlling the applicator assembly to apply ink according to the age of the ink.

Example 18: The method of any preceding example, comprising controlling the applicator assembly to apply ink according to the binder to conductive filler ratio of the ink.

Example 19: The method of any preceding example, comprising controlling the applicator assembly to apply ink according to the binder to solvent ratio of the ink.

Example 21: The method of any preceding example, comprising controlling the applicator assembly to apply ink according to the solvent to conductive filler ratio of the ink.

Example 22: The method of any preceding example, comprising controlling the applicator assembly to apply ink according to the material rheology of the ink.

Example 23: The method of any preceding example, comprising controlling the applicator assembly to apply ink according to the curing temperature of the ink.

Example 24: The method of any preceding example, comprising controlling the applicator assembly to apply ink according to the curing time of the ink.

Example 25: The method of any preceding example, comprising controlling the applicator assembly to apply ink according to the vapor pressure of the ink.

Example 26: The method of any preceding example, comprising controlling the applicator assembly to apply ink according to the conductive filler loading of the ink.

Example 27: The method of any preceding example, comprising controlling the applicator assembly to apply ink according to the particle size distribution of the ink.

Example 28: The method of any preceding example, comprising controlling the applicator assembly to apply ink according to the particle orientation of the ink after the ink is cured.

Example 29: The method of any preceding example, comprising controlling the applicator assembly to apply ink according to the adhesion properties of the ink with respect to the lens surface.

Example 30: The method of any preceding example, comprising controlling the applicator assembly to apply ink according to the material elongation properties of the ink.

Example 31: The method of any preceding example, comprising controlling the applicator assembly to apply ink according to the surface energy of the lens surface.

Example 32: The method of any preceding example, comprising controlling the applicator assembly to adjust the force of a plunger of the applicator assembly.

Example 33: The method of any preceding example, comprising controlling the applicator assembly to adjust a plunger velocity of a plunger in the applicator assembly.

Example 34: The method of any preceding example, comprising controlling the applicator assembly to apply ink according to the length of a plunger of the applicator assembly.

Example 35: The method of any preceding example, comprising controlling the applicator assembly to apply ink according to the diameter of a plunger of the applicator assembly.

Example 36: The method of any preceding example, comprising controlling the applicator assembly to apply ink according to the configuration of an orifice of the applicator assembly from which the ink is applied.

Example 37: The method of any preceding example, comprising controlling the applicator assembly to apply ink according to the frequency of movement of a plunger of the applicator assembly.

Example 38: The method of any preceding example, comprising controlling the applicator assembly to apply ink according to the maximum travel speed of a plunger of the applicator assembly.

Example 39: The method of any preceding example, comprising controlling the applicator assembly to adjust the size of a shot of ink according to the shot energy and frequency between shots of ink applied by the applicator assembly.

Example 40: The method of any preceding example, comprising controlling the applicator assembly to adjust the Linear Mass Density (LMD) of the ink applied to the lens according to the frequency at which shots of ink are applied by the applicator assembly.

Example 41: The method of any preceding example, comprising controlling the applicator assembly to adjust the Linear Mass Density (LMD) of the ink applied to the lens according to the size of shots of ink applied by the applicator assembly.

Example 42: The method of any preceding example, comprising controlling the applicator assembly to adjust the Linear Mass Density (LMD) of the ink applied to the lens according to the material conductivity of the conductive ink after curing.

Example 43: The method of any preceding example, comprising controlling the applicator assembly to apply ink according to the spacing of the ink dispensed on the surface of the lens.

Example 44: The method of any preceding example, wherein the viscosity of the ink is between 17,000 and 25,000 centipoise @ 0.1 secs.

Example 45: The method of any preceding example, wherein the viscosity of the ink is between 4,500 centipoise and 7,500 centipoise @ 0.01 secs.

Example 46: The method of any preceding example, wherein the sheet resistivity of ink is between 0.01 and 0.02 ohm/square/mil.

Example 47: The method of any preceding example, wherein the binder to solvent ratio of the ink is between 3 pph and 5 pph.

Example 48: The method of any preceding example, wherein the silver loading of the ink is between 55% and 95%.

Example 49: The method of any preceding example, wherein the ink comprises silver, copper, gold, carbon and/or other metals, or other macro or nano particles, or any suitable combination thereof.

Example 50: The method of any preceding example, comprising maintaining the conductive ink at less than 12 degrees C. during transportation and storage.

Example 51: The method of any preceding example, comprising measuring the viscosity of the ink by sampling, optionally prior to application.

Example 52: The method of any preceding example, comprising measuring the sheet resistivity of the ink by sampling, optionally prior to application.

Example 53: The method of any preceding example, wherein the ink is loaded into syringes before application.

Example 54: The method of any preceding example, comprising agitating the ink for a predetermined period of less than 30 secs using an agitator.

Example 55: The method of any preceding example, comprising purging air bubbles from a nozzle of the applicator assembly.

Example 56: The method of any preceding example, comprising setting a voltage If the applicator assembly to between 50V and 245V.

Example 57: The method of any preceding example, comprising setting a temperature of the ink to between 25 and 45 degrees C. using a temperature control of the applicator assembly.

Example 58: The method of any preceding example, comprising setting an air pressure to 40 PSI guage.

Example 59: The method of any preceding example, comprising adjusting a flow rate of the ink to control the resulting resistance of the traces.

Example 60: The method of any preceding example, comprising controlling the applicator assembly to compensate for shifts in material sheet resistivity of the traces.

Example 61: The method of any preceding example, comprising adjusting pressure applied to the ink by the applicator assembly based on sheet resistivity and flow rate for each separate batch of ink.

Example 62: The method of any preceding example, comprising using a sensor to monitor a flow rate of ink applied by the nozzle during dispensing.

Example 63: The method of any preceding example, comprising adjusting dispensing parameters of the applicator assembly in real time according to flow rate of the ink to achieve a predetermined sheet resistivity.

Example 64: The method of any preceding example, comprising preparing the lens for application of ink.

Example 65: The method of any preceding example, comprising reducing or eliminating static electricity from surface of the lens.

Example 66: The method of any preceding example, comprising activating a deionizing blower for between 10 and 60 secs to reduce or eliminate static electricity on the surface of the lens.

Example 67: The method of any preceding example, comprising preparing a dispensing path according to desired aesthetic and heating grid constraints.

Example 68: The method of any preceding example, comprising defining a dispensing path using the control circuit, the control circuit configured to provide a programming user interface using a display device.

Example 69: The method of any preceding example, comprising defining changes in printing head speed and acceleration according to the dispensing path.

Example 70: The method of any preceding example, comprising defining an ink deposition rate in grams/mm.

Example 71: The method of any preceding example, comprising defining printing head speed and acceleration to control width and height of resistive traces.

Example 72: The method of any preceding example, comprising defining dispensing height of printing head.

Example 73: The method of any preceding example, comprising defining increased dispensing height as a function of increased radial dispersion of ink.

Example 74: The method of any preceding example, wherein the dispensing height is adjusted depending on the location of the print head on the dispensing path.

Example 75: The method of any preceding example, comprising moving the applicator assembly across the surface of the lens to apply the ink.

Example 76: The method of any preceding example, comprising moving the surface of the lens adjacent to the applicator assembly to apply the ink.

Example 77: The method of any preceding example, comprising controlling the applicator assembly to independently rotate on up to three different axes of rotation to maintain a preferred angle of incidence between the applicator assembly and the lens surface.

Example 78: The method of any preceding example, comprising controlling the applicator assembly to move independently on up to three separate axes to maintain the head at a preferred distance from surface of the lens.

Example 79: The method of any preceding example, comprising controlling the applicator assembly to change position of the nozzle relative to the surface of the lens.

Example 80: The method of any preceding example, comprising controlling the applicator assembly to automatically change orientation of the nozzle relative to contours of the lens.

Example 81: The method of any preceding example, wherein the nozzle is cleaned using ultrasonic cleaning device.

Example 82: The method of any preceding example, wherein the nozzle is manual scrubbing and cleansing agents.

Example 83: The method of any preceding example, comprising cleaning the nozzle after completion of each lens.

Example 84: The method of any preceding example, comprising heating the lens uncured traces to between 50 and 150 degrees C. for a predetermined period of time.

Example 85: The method of any preceding example, comprising heating the lens uncured traces to a predetermined temperature for between 35 and 350 minutes to cure the traces.

Example 86: The method of any preceding example, comprising heating the lens in a forced convection oven.

Example 87: The method of any preceding example, comprising moving the lens with uncured traces from the printing area to a curing oven before a predetermined exposure time limit expires.

Example 88: The method of any preceding example, comprising inspecting the traces for defects either before or after curing.

Example 89: The method of any preceding example, comprising measuring the resistance of the traces after curing.

Example 90: The method of any preceding example, comprising testing thermal properties of the cured traces by applying power to the traces.

Example 91: The method of any preceding example, comprising testing thermal properties of the cured traces using a thermal imaging device to view resulting heating pattern.

Example 92: The method of any preceding example, comprising comparing the thermal heating output from the traces to the previously prepared trace pattern.

Example 93: The method of any preceding example, comprising examining the cured traces for irregularities in temperature and discontinuity in the traces.

Example 94: The method of any preceding example, wherein the current draw of the traces is less than 10 A.

Example 95: The method of any preceding example, wherein the current draw is greater than 1 A.

Example 96: The method of any preceding example, wherein the voltage across the traces is between 50 and 200V.

Example 97: The method of any preceding example, wherein the resistance of the traces is less than 10 Ohms.

Example 98: The method of any preceding example, wherein the resistance of the traces is greater than 1.5 Ohms.

Example 99: The method of any preceding example, comprising applying an anti-fog coating to an inside surface of lens.

Example 100: The method of any preceding example, comprising applying a hardening coating to an outside surface of lens.

Example 101: The method of any preceding example, comprising repeating claims 88-98 after applying the coatings of claims 99 and/or 100.

Example 102: The method of any preceding example, wherein the application of the conductive ink is made using an ink jet dispensing head as part of the applicator assembly.

Example 103: The method of any preceding example, wherein the ink is dispensed at less than 5 mm from surface of the lens.

Example 104: The method of any preceding example, wherein the ink is dispensed at less than 15 mm from surface of the lens.

Example 105: The method of any preceding example, wherein the ink is dispensed between 6 mm and 14 mm for less than 40 mm of the trace length.

Example 106: The method of any preceding example, wherein the ink is applied at greater distances from lens surface to overcome geometrical obstacles such as tabs, flanges, or bumps.

Example 107: The method of any preceding example, comprising capturing images of printing process with a camera.

Example 108: The method of any preceding example, comprising capturing images of printing process with a camera mounted adjacent to the printing head.

Example 109: The method of any preceding example, comprising capturing images of the printing process with a camera mounted with the applicator assembly.

Example 110: The method of any preceding example, comprising determining an acceptable power distribution for the lens surface and adjusting trace spacing and/or trace width accordingly for the planned trace pattern.

Example 111: The method of any preceding example, wherein the traces are spaced at least 1 mm apart or more.

Example 112: The method of any preceding example, comprising determining a minimum turn angle for the pattern of traces to be applied to the lens.

Example 113: The method of any preceding example, wherein the minimum turn angle for traces in the pattern is at least 20 degrees or more.

Example 114: The method of any preceding example, comprising determining a minimum turn radius for the pattern of traces to be applied to the lens.

Example 115: The method of any preceding example, wherein the minimum turn radius is at least 0.5 mm or more.

Example 116: The method of any preceding example, comprising determining a pad geometry for electrical pads to be applied to the lens, wherein the electrical pads are arranged and configured to electrically connect the traces to a power connector.

Example 117: The method of any preceding example, wherein the pad geometry is rectangular and between 50 $mm^2$ and 200 $mm^2$.

Example 118: The method of any preceding example, wherein the pad is between 0.05 mm and 1.5 mm in thickness.

Example 119: The method of any preceding example, comprising determining a trace height for the traces to be applied to the lens.

Example 120: The method of any preceding example, comprising determining a variable trace height, the trace height for the traces to be applied to lands varying according to trace width and the location on the lens.

Example 121: The method of any preceding example, wherein a nominal trace height is about between 0.05 and 0.5 mm.

Example 122: The method of any preceding example, wherein a nominal trace height varies between about 50 microns and about 150 microns.

Example 123: The method of any preceding example, wherein a trace height of traces to be applied to the lens may vary according to a cross section of the individual traces.

Example 124: The method of any preceding example, comprising determining a trace width for traces to be applied to the lens.

Example 125: The method of any preceding example, comprising determining a variable trace width for traces to be applied to the lens, the variable trace width varying according to the trace height and location on the lens.

Example 126: The method of any preceding example, comprising determining a trace width according to ink viscosity, ink thixotropy, and an amount of ink to deposit per unit length.

Example 127: The method of any preceding example, comprising determining an amount of ink to deposit per unit length of the trace according to ink flow rate and travel speed of the nozzle.

Example 128: The method of any preceding example, wherein a nominal flow rate of the ink is less than 30 mg/sec at less than 75 mm/sec nozzle speed.

Example 129: The method of any preceding example, wherein a nominal flow rate of the ink is between 15 mg/sec to 70 mg/sec at less than 75 mm/sec nozzle speed.

Example 130: The method of any preceding example, wherein a nominal trace width is less than 1200 microns.

Example 131: The method of any preceding example, wherein a nominal trace width is between about 0.5 mm and about 1.5 mm.

Example 132: The method of any preceding example, wherein the traces define a heating grid that includes multiple parallel loops.

Example 133: The method of any preceding example, wherein the traces define a heating grid that includes at least 2 parallel portions and at least one corner portion electrically connecting the two parallel portions.

Example 134: The method of any preceding example, comprising modifying the proposed trace pattern for the lens according to maximum linear resistance of the ink.

Example 135: The method of any preceding example, comprising modifying the proposed trace length of the trace pattern for the lens to accommodate a maximum linear resistance of the ink.

Example 136: The method of any preceding example, comprising modifying the linear trace length of the trace pattern according to a maximum time the ink may be exposed to ambient temperatures before curing.

Example 137: The method of any preceding example, wherein the maximum linear trace length for the traces in the trace pattern is about 7500 mm or less.

Example 138: The method of any preceding example, wherein a maximum time the ink may be exposed to ambient conditions is about 15 minutes or less.

Example 139: The method of any preceding example, comprising modifying the traces in the trace pattern according to maximum speed of movement for the nozzle.

Example 140: The method of any preceding example, wherein a maximum nozzle speed is between about 15 mm/sec and about 100 mm/sec.

Example 141: The method of any preceding example, comprising modifying the resistivity of the traces in the pattern of traces to accommodate maximum linear resistance of the ink.

Example 142: The method of any preceding example, comprising modifying the thickness of the traces to accommodate a resistivity of the ink.

Example 143: The method of any preceding example, comprising modifying the thickness of the traces to accommodate a thixotropic index of the ink.

Example 144: The method of any preceding example, comprising modifying the thickness of the traces to accommodate a shear viscosity of the ink.

Example 145: The method of any preceding example, comprising modifying the thickness of the traces to accommodate a nominal sheet resistivity of the ink.

Example 146: The method of any preceding example, comprising controlling the nozzle to apply a first application of ink to the lens in a predetermined trace pattern; and controlling the nozzle to apply a second application of ink to the lens, wherein the second application of ink is applied over the first application of ink according to the predetermined trace pattern.

Example 147: The method of any preceding example, comprising controlling the nozzle to apply multiple layers of ink, wherein the combined thickness of the multiple layers of ink is 1 mm or less.

Glossary of Terms and Alternative Wordings

While examples of the inventions are illustrated in the drawings and described herein, this disclosure is to be considered as illustrative and not restrictive in character. The present disclosure is exemplary in nature and all changes, equivalents, and modifications that come within the spirit of the invention are included. The detailed description is included herein to discuss aspects of the examples illustrated in the drawings for the purpose of promoting an understanding of the principles of the inventions. No limitation of the scope of the inventions is thereby intended. Any alterations and further modifications in the described examples, and any further applications of the principles described herein are contemplated as would normally occur to one skilled in the art to which the inventions relate. Some examples are disclosed in detail, however some features that may not be relevant may have been left out for the sake of clarity.

Where there are references to publications, patents, and patent applications cited herein, they are understood to be incorporated by reference as if each individual publication, patent, or patent application were specifically and individually indicated to be incorporated by reference and set forth in its entirety herein.

Singular forms “a”, “an”, “the”, and the like include plural referents unless expressly discussed otherwise. As an illustration, references to “a device” or “the device” include one or more of such devices and equivalents thereof.

Directional terms, such as “up”, “down”, “top” “bottom”, “fore”, “aft”, “lateral”, “longitudinal”, “radial”, “circumferential”, etc., are used herein solely for the convenience of the reader in order to aid in the reader’s understanding of the illustrated examples. The use of these directional terms does not in any manner limit the described, illustrated, and/or claimed features to a specific direction and/or orientation.

Multiple related items illustrated in the drawings with the same part number which are differentiated by a letter for separate individual instances, may be referred to generally by a distinguishable portion of the full name, and/or by the number alone. For example, if multiple “laterally extending elements” 90A, 90B, 90C, and 90D are illustrated in the drawings, the disclosure may refer to these as “laterally extending elements 90A-90D,” or as “laterally extending elements 90,” or by a distinguishable portion of the full name such as “elements 90”.

The language used in the disclosure are presumed to have only their plain and ordinary meaning, except as explicitly defined below. The words used in the definitions included herein are to only have their plain and ordinary meaning. Such plain and ordinary meaning is inclusive of all consistent dictionary definitions from the most recently published Webster’s and Random House dictionaries. As used herein, the following definitions apply to the following terms or to common variations thereof (e.g., singular/plural forms, past/present tenses, etc.):

“About” with reference to numerical values generally refers to plus or minus 10% of the stated value. For example if the stated value is 4.375, then use of the term “about 4.375” generally means a range between 3.9375 and 4.8125.

“Activate” generally is synonymous with “providing power to”, or refers to “enabling a specific function” of a circuit or electronic device that already has power.

“And/or” is inclusive here, meaning “and” as well as “or”. For example, “P and/or Q” encompasses, P, Q, and P with Q; and, such “P and/or Q” may include other elements as well.

“Cable” generally refers to one or more elongate strands of material that may be used to carry electromagnetic or electrical energy. A metallic or other electrically conductive material may be used to carry electric current. In another example, strands of glass, acrylic, or other substantially transparent material may be included in a cable for carrying light such as in a fiber-optic cable. A cable may include connectors at each end of the elongate strands for connecting to other cables to provide additional length. A cable is generally synonymous with a node in an electrical circuit and provides connectivity between elements in a circuit but does not include circuit elements. Any voltage drop across a cable is therefore a function of the overall resistance of the material used. A cable may include a sheath or layer surrounding the cable with electrically non-conductive material to electrically insulate the cable from inadvertently electrically connecting with other conductive material adjacent the cable. A cable may include multiple individual component cables, wires, or strands, each with, or without, a nonconductive sheathing. A cable may also include a non-conductive sheath or layer around the conductive material, as well as one or more layers of conductive shielding material around the non-conductive sheath to capture stray electromagnetic energy that may be transmitted by electromagnet signals traveling along the conductive material of the cable, and to insulate the cable from stray electromagnetic energy that may be present in the environment the cable is passing through. Examples of cables include twisted pair cable, coaxial cable, "twin-lead", fiber-optic cable, hybrid optical and electrical cable, ribbon cables with multiple side-by-side wires, and the like.

"Centipoise" generally refers to a unit of measure for dynamic viscosity. One centipoise is equal to one millipascal second. For example, water is 1 centipoise whereas peanut butter is about 250,000 or about $2.5\times10^{-5}$ centipoise.

"Coating" generally refers to a covering that is applied to the surface of an object, the object sometimes referred to as the substrate. The purpose of applying the coating may be decorative, functional, or both. A single coating may provide one purpose such as to be functional in one area of the coating, and to provided decoration in another area. The coating may completely cover the substrate, or it may only cover parts of the substrate thus defining interstices, openings, or voids in the coating. Coatings are sometimes applied to a material repeatedly thus creating multiple coatings on top one another.

"Communication Link" generally refers to a connection between two or more communicating entities and may or may not include a communications channel between the communicating entities. The communication between the communicating entities may occur by any suitable means. For example, the connection may be implemented as a physical link, an electrical link, an electromagnetic link, a logical link, or any other suitable linkage facilitating communication.

In the case of a physical link, communication may occur by multiple components in the communication link configured to respond to one another by physical movement of one element in relation to another. In the case of an electrical link, the communication link may be composed of multiple electrical conductors electrically connected to form the communication link.

In the case of an electromagnetic link, the connection may be implemented by sending or receiving electromagnetic energy at any suitable frequency, thus allowing communications to pass as electromagnetic waves. These electromagnetic waves may or may not pass through a physical medium such as an optical fiber, or through free space via one or more sending and receiving antennas, or any combination thereof. Electromagnetic waves may be passed at any suitable frequency including any frequency in the electromagnetic spectrum.

A communication link may include any suitable combination of hardware which may include software components as well. Such hardware may include routers, switches, networking endpoints, repeaters, signal strength enters, hubs, and the like.

In the case of a logical link, the communication link may be a conceptual linkage between the sender and recipient such as a transmission station in the receiving station. Logical link may include any combination of physical, electrical, electromagnetic, or other types of communication links.

"Contact" means here a condition or state where at least two objects are physically touching. As used, contact requires at least one location where objects are directly or indirectly touching, with or without any other member(s) material in between.

"Convex" generally refers to a line or surface that curves away from a reference point. Such a surface may also be said to curve "outwardly" away from the reference point.

"Concave" generally refers to a line or surface that curves toward a reference point. Such a surface may also be said to curve "inwardly" toward the reference point.

"Cross-sectional Area" generally refers to generally refers to the area of a non-empty intersection of a solid body in three-dimensional space with a plane. The shape of the cross-section of a solid may depend upon the orientation of the cutting plane to the solid. For example, while all the cross-sections of a ball are disks of varying diameters, the cross-sections of a cube depend on how the cutting plane is related to the cube. If the cutting plane is perpendicular to a line joining the centers of two opposite faces of the cube, the cross-section will be a square, however, if the cutting plane is perpendicular to a diagonal of the cube joining opposite vertices, the cross-section can be either a point, a triangle or a hexagon. A cross-section of a solid right circular cylinder extending between two bases is a disk if the cross-section is parallel to the cylinder's base, or an elliptic region if it is neither parallel nor perpendicular to the base. If the cutting plane is perpendicular to the base it consists of a rectangle unless it is just tangent to the cylinder, in which case it is a single line segment.

"Electrically Connected" generally refers to a configuration of two objects that allows electricity to flow between them or through them. In one example, two conductive materials are physically adjacent one another and are sufficiently close together so that electricity can pass between them. In another example, two conductive materials are in physical contact allowing electricity to flow between them.

"Forced Convection Oven" generally refers to an oven that includes a fan inside the wall or other portion of the oven which is arranged and configured to force the heated air in the oven to circulate throughout it. The forced air circulation system may thus provide both temperature uniformity throughout the oven and/or rapid heat recovery.

"Ground" or "circuit ground" generally refers to a node in an electrical circuit that is designated as a reference node for other nodes in a circuit. It is a reference point in an electrical circuit from which voltages are measured, a common return path for electric current, and/or a direct physical connection to the Earth.

"Lamp" generally refers to an electrical device configured to produce light using electrical power. The generated light may be in the visible range, ultraviolet, infrared, or other light. Example illumination technologies that may be employed in a lamp include, but are not limited to, incandescent, halogen, LED, fluorescent, carbon arc, xenon arc, metal-hallide, mercury-vapor, sulfer, neon, sodium-vapor, or others.

"LED Lamp" generally refers to an electrical device that uses Light Emitting Diodes (LEDs) to produce light using electrical power. A lamp may include a single LED, or multiple LEDs.

"Lens" generally refers to a light transmissive element that may be shaped to concentrate or disperse light. In the context of automotive headlamps, tail lamps, or other lamps, a lens may provide reflection, refraction, color changes, or other modifications to light emitted by the lamp. In another aspect, an automotive lens may provide protection to circuits or light emitters in the lamp, and may also function as a light transmissive cover that optionally includes aspects that result in the concentration or dispersion of light.

"Light Emitting Diode" or "LED" generally refers to a diode that is configured to emit light when electrical power passes through it. The term may be used to refer to single diodes as well as arrays of LED's and/or grouped light emitting diodes. This can include the die and/or the LED film or other laminate, LED packages, said packages may include encapsulating material around a die, and the material, typically transparent, may or may not have color tinting and/or may or may not have a colored sub-cover. An LED can be a variety of colors, shapes, sizes and designs, including with or without heat sinking, lenses, or reflectors, built into the package.

"Light Transmissive" means permitting light to pass through it, such as being transparent, translucent, with or without tint, lenses, ridges and/or prisms.

"Metallic" generally refers to a material that includes a metal, or is predominately (50% or more by weight) a metal. A metallic substance may be a single pure metal, an alloy of two or more metals, or any other suitable combination of metals. The term may be used to refer to materials that include nonmetallic substances. For example, a metallic cable may include one or more strands of wire that are predominately copper sheathed in a polymer or other non-conductive material.

"Multiple" as used herein is synonymous with the term "plurality" and refers to more than one, or by extension, two or more.

"Opaque" generally refers to a property of a substance whereby the substance substantially blocks the passage of radiant energy such as light, or other electromagnetic energy.

"Optionally" as used herein means discretionary; not required; possible, but not compulsory; left to personal choice.

"Polymeric Material" or "Polymer" generally refers to naturally occurring and synthetic materials characterized by a molecular structure formed from the repetition of subunits bonded together. Examples include, but are not limited to, naturally occurring substances such as amber, silk, hemp, and many kinds of synthetic substances such polyethylene, polypropylene, polystyrene, polyvinyl chloride, synthetic rubber, phenol formaldehyde resin (or Bakelite), neoprene, nylon, polyacrylonitrile, silicone, and the like.

"Power Connector" generally refers to devices or assemblies that allow electrical power to be selectively applied from one circuit to another. Examples include mechanical plugs and sockets or other similar devices that allow an electrical connection to be made between to circuits. A power connector may be configured with multiple pins, terminals, or other contact points to connect multiple cables or circuits together within the same physical connector. Examples include, but are not limited to, industrial and multiphase plugs and sockets, power plugs and receptacles that comply with the National Electrical Manufacturers Association (NEMA) for providing AC power, cylindrical or coaxial power connectors commonly used to carry DC power, snap and lock DC power connectors, Molex connectors, Tamiya connectors commonly used on radio-control vehicle battery packs and chargers, Anderson Powerpole connectors, Society of Automotive Engineers (SAE) connector which is a hermaphrodite two-conductor DC connector commonly used for solar and automotive applications, Universal Serial Bus (USB) connectors and sockets, as well as 4, 5, 6, and 7-way (or more) trailer wiring connectors and sockets that are used to selectively supply power from a towing vehicle to a trailer.

"Predominately" as used herein is synonymous with greater than 50%.

"Rheology" generally refers to aspects related to the flow or deformation characteristics of materials placed under an applied force. For example, polymeric materials may exhibit complex flow properties that may impact fabrication, extruision, coextrusion, heat bonding, and other aspects that may be relevant to using such materials.

"Resistivity" generally refers to a measure of the resistance of a given size of a specific material to electrical conduction. Resistivity may also be referred to as the specific electrical resistance, or volume resistivity, although these terms are less widely used. Although materials resist the flow of electrical current, some are better at conducting it than others. Resistivity is a figure that enables comparisons of the way in which different materials allow or resist current flow. Materials that conduct electrical current easily are called conductors and have a low resistivity. Those that do not conduct electricity easily are called insulators and these materials have a high resistivity.

The resistivity of a substance is the resistance of a cube of that substance having edges of unit length, with the understanding that the current flows normal to opposite faces and is distributed uniformly over them. The electrical resistivity is the electrical resistance per unit length and per unit of cross-sectional area at a specified temperature. The SI unit of electrical resistivity is the ohm·metre (Ω·m). It is commonly represented by the Greek letter p, rho. Although the SI resistivity unit, the ohms metre is generally used, sometimes figures will be seen described in terms of ohms centimeters, Q·cm.

"Surface Energy", "Surface free energy", or "interfacial free energy" generally refers to quantifying the disruption of intermolecular bonds that occurs when a surface is created. In the physics of solids, surfaces must be intrinsically less energetically favorable than the bulk of a material (the molecules on the surface have more energy compared with the molecules in the bulk of the material), otherwise there would be a driving force for additional surfaces to be created, thus removing the bulk of the material (e.g. as in the process of sublimation). The surface energy may therefore be defined as the excess energy at the surface of a material compared to the bulk, or it is the work required to build an area of a particular surface. In another aspect, surface energy is related to the work required to cut a bulk sample, creating two surfaces. There is "excess energy" as a result of the now-incomplete, unrealized bonding at the two surfaces.

"Terminal" generally refers to a plug, socket or other connection (male, female, mixed, hermaphroditic, or otherwise) for mechanically and electrically connecting two or more wires or other conductors.

"Thixotropy" generally refers to a time-dependent shear thinning property of a substance. Thixotropy generally arises because particles or structured solutes require time to organize. Thus some gels or fluids that are thick or viscous under static conditions will flow (become thinner, less viscous) over time when shaken, agitated, shear-stressed, or otherwise stressed. They may later return to a more viscous state. Some non-Newtonian pseudoplastic fluids show a time-dependent change in viscosity; the longer the fluid undergoes shear stress, the lower its viscosity. A thixotropic fluid is a fluid which takes a finite time to attain equilibrium viscosity when introduced to a steep change in shear rate. Some thixotropic fluids return to a gel state almost instantly, such as ketchup, and are called pseudoplastic fluids. Others such as yogurt take much longer and can become nearly solid. Many gels and colloids may be classified as thixotropic materials, exhibiting a stable form at rest but becoming fluid when agitated.

"Trace" generally refers to an electrical conductor physically coupling and electrically connecting two other electrical conductors. Examples of a traces include electrical connections between components on a Printed Circuit Board (PCB), or wires electrically connecting to portions of an electrical circuit. A bundle of wires electrically connecting multiple circuits together may be thought of as a single trace or lead, or as multiple separate traces or leads.

"Transparent" generally refers to a property of a substance whereby the substance allos the substantially unobstructed transmission of radiant energy such as light or other electromagnetic energy, without appreciable obstruction or scattering. For example, transparent substances allow for light transmission to an extent that objects can be clearly seen through the substance with little or loss of clarity.

"Turn Signal Lamp" generally refers to lamps positioned on a vehicle or trailer to warn of a change in the direction of travel when activated. Sometimes referred to as "direction indicators" or "directional signals", or as "directionals", "blinkers", "indicators" or "flashers"-turn signal lam blinking lamps mounted near the left and right front and rear corners of a vehicle or trailer. As used herein, the term generally refers to a turn signal lamp which is compliant with present legal and/or regulatory requirements for a truck or a trailer such as illuminated surface area, candela, and otherwise. Such regulations include, for example, Title 49 of the U.S. Code of Federal Regulations, section 571.108, also known as Federal Motor Vehicle Safety Standard (FMVSS) 108

"Unitary Molded Structure" generally refers to a structure formed as a single or uniform entity.

"Vehicle" generally refers to a self-propelled or towed device for transportation, including without limitation, car, truck, bus, boat, tank or other military vehicle, airplane, truck trailer, truck cab, boat trailer, other trailer, emergency vehicle, and motorcycle.

"Viscosity" generally refers to a measure of a fluids resistance to deformation at a given rate. A fluid that has a low viscosity has little resistance to shear stress. For example, water. A fluid with a high viscosity has a larger resistance to shear stress. For example, syrup. A fluid with no resistance to shear stress is known as an ideal or inviscid fluid. This is only observed at very low temperatures in superfluid's such as liquid helium. Dynamic viscosity is measured in Pascal-seconds in the SI system and is measured in poise or centipoise in the centimeter-gram-second measurement system.

What is claimed is:

1. A method, comprising:

applying conductive traces comprising conductive ink to a lens using an applicator assembly controlled by a control circuit, wherein the applicator assembly includes a spray nozzle configured to apply the conductive ink to the lens without contacting the lens;

programming or configuring the control circuit to control the applicator assembly according to a predefined pattern specifying locations for the conductive traces on the lens;

applying the conductive ink of the conductive traces to the surface of the lens using the applicator assembly controlled by the control circuit, wherein the control circuit automatically adjusts a position of the applicator assembly according to the pattern;

using the control circuit to control the applicator assembly to adjust a Linear Mass Density (LMD) of the conductive ink applied to the lens according to a material conductivity of the conductive ink; and curing the conductive ink applied to the lens after applying the conductive ink.

2. The method of claim 1, comprising:

automatically adjusting the operation of the applicator assembly based on the LMD of the conductive ink applied by the applicator assembly.

3. The method of claim 2, comprising:

using the control circuit to control the applicator assembly to adjust the LMD of the conductive ink applied to the lens according to a frequency at which individual separate portions of ink are applied by the applicator assembly.

4. The method of claim 2, comprising:

using the control circuit to control the applicator assembly to adjust the LMD of the conductive ink applied to the lens according to the size of individual separate portions of ink applied by the applicator assembly.

5. The method of claim 1, comprising:

automatically adjusting the operation of the applicator assembly based on a material rheology and/or a material conductivity of the conductive ink.

6. The method of claim 1, comprising:

automatically adjusting the operation of the applicator assembly based on a frequency at which individual shots of ink are applied over time, or a size of the individual shots of ink, or any combination thereof.

7. The method of claim 1, comprising:

automatically adjusting the operation of the applicator assembly based on a conductive filler ratio defined by a ratio of a binder to a conductive filler of the conductive ink, a solvent ratio defined by a ratio of the binder to a solvent of the conductive ink, or a material ratio defined by a ratio of the solvent to a conductive filler of the conductive ink, or any combination thereof.

8. The method of claim 7, wherein the solvent ratio of the conductive ink is between 3 pph and 5 pph.

9. The method of claim 1, comprising:

controlling the applicator assembly to automatically adjust a force applied to the conductive ink by a plunger of the applicator assembly.

10. The method of claim 9, comprising:

controlling the applicator assembly to apply the conductive ink according to a frequency of movement of the plunger.

11. The method of claim 1, comprising:

controlling the applicator assembly to apply ink according to the spacing of the conductive ink defined in a pattern, wherein the pattern determines the location of the conductive traces to be applied to the lens.

12. The method of claim 1, wherein the conductive ink comprises silver, copper, gold, carbon and/or other metals, or other macro or nano particles, or any suitable combination thereof.

13. The method of claim 1, comprising:

automatically adjusting a temperature of the conductive ink to between 25 and 45 degrees C. using a temperature control of the applicator assembly.

14. The method of claim 1, comprising:

adjusting a flow rate of the conductive ink applied by the applicator assembly in order to control the resulting resistance of the traces.

15. The method of claim 1, comprising:
controlling the applicator assembly to automatically compensate for shifts in material sheet resistivity of the traces.

16. The method of claim 1, comprising:
controlling the applicator assembly to automatically rotate on up to three different axes of rotation to maintain a predetermined angle of incidence between the applicator assembly and an application surface of the lens where the conductive ink is to be applied.

17. The method of claim 16, comprising:
controlling the applicator assembly to move independently on up to three separate axes to maintain the head at a predetermined distance from the application surface of the lens.

18. The method of claim 16, comprising:
controlling the applicator assembly to automatically change orientation of the applicator assembly so that a nozzle of the applicator assembly is oriented perpendicularly relative to the application surface of the lens.

19. The method of claim 1, comprising:
determining a height of the conductive traces applied to the lens.

20. The method of claim 19, wherein the height of the conductive traces is automatically adjusted by the control circuit according to a width of the conductive traces and a location on the conductive traces on the lens.

21. The method of claim 1, comprising:
controlling the nozzle to apply a first application of ink to the lens in a predetermined trace pattern; and
controlling the nozzle to apply a second application of ink to the lens, wherein the second application of ink is applied over the first application of ink according to the predetermined trace pattern.

22. The method of claim 21, wherein a combined thickness of the conductive traces after the first and second application of ink is 1 mm or less.

* * * * *